US012366310B2

(12) United States Patent
McNeil et al.

(10) Patent No.: US 12,366,310 B2
(45) Date of Patent: Jul. 22, 2025

(54) HELICALLY WOUND TUBULAR STRUCTURES

(71) Applicant: Techreo LLC, Loveland, OH (US)

(72) Inventors: Kevin B. McNeil, Loveland, OH (US); Gregory V. McNeil, Dewitt, MI (US); Wayne R. Fisher, Cincinnati, OH (US); Thomas T. Byrne, West Chester, OH (US)

(73) Assignee: Techreo LLC, Loveland, OH (US)

( * ) Notice: Subject to any disclaimer, the term of this patent is extended or adjusted under 35 U.S.C. 154(b) by 0 days.

(21) Appl. No.: 16/747,522

(22) Filed: Jan. 20, 2020

(65) Prior Publication Data

US 2020/0263812 A1    Aug. 20, 2020

Related U.S. Application Data

(60) Provisional application No. 62/873,124, filed on Jul. 11, 2019, provisional application No. 62/815,451,
(Continued)

(51) Int. Cl.
*F16L 9/16* (2006.01)
*B21C 37/12* (2006.01)
*B21C 37/15* (2006.01)
*B21D 5/14* (2006.01)
*B21D 9/04* (2006.01)
*F16L 9/04* (2006.01)
*F16L 59/14* (2006.01)
*F16L 59/147* (2006.01)
*B21C 37/09* (2006.01)

(52) U.S. Cl.
CPC ............ *F16L 9/165* (2013.01); *B21C 37/154* (2013.01); *B21C 37/157* (2013.01); *B21D 5/14* (2013.01); *B21D 9/04* (2013.01); *F16L 9/042* (2013.01); *F16L 9/045* (2013.01); *F16L 59/143* (2013.01); *F16L 59/147* (2013.01); *B21C 37/09* (2013.01); *B21C 37/123* (2013.01); *F16L 9/16* (2013.01)

(58) Field of Classification Search
CPC ..... B21C 37/09; B21C 37/123; B21C 37/156; B21C 37/157; F16L 9/042; F16L 9/045; F16L 9/16; F16L 9/165
See application file for complete search history.

(56) References Cited

U.S. PATENT DOCUMENTS 2,002,470 A    5/1935  Cornell
2,104,884 A    1/1938  Quarnstrom
(Continued)

FOREIGN PATENT DOCUMENTS

DE    16513381         10/1996
DE    19513381 A1 *   10/1996   ........... B21C 37/154
GB    747194            3/1956

*Primary Examiner* — Kenneth Rinehart
*Assistant Examiner* — Richard K. Durden
(74) *Attorney, Agent, or Firm* — Wood Herron & Evans LLP

(57) ABSTRACT

A helically wound tubular structure formed from helically wound sheet metals is disclosed. The tubular structure has a first sheet metal helically wound about a longitudinal axis. A second sheet metal having voids disposed therein is helically wound about the longitudinal axis and coaxially about the first sheet metal. A third sheet metal is helically wound about the longitudinal axis and coaxially about the first sheet metal and the second sheet metal.

15 Claims, 12 Drawing Sheets

Related U.S. Application Data filed on Mar. 8, 2019, provisional application No. 62/797,426, filed on Jan. 28, 2019, provisional application No. 62/794,638, filed on Jan. 20, 2019.

(56) References Cited

U.S. PATENT DOCUMENTS

| | | | |
|---|---|---|---|
| 2,412,186 A | 12/1946 | Whitehouse et al. | |
| 2,640,501 A | 6/1953 | Scott et al. | |
| 2,663,324 A | 12/1953 | Fentress | |
| 3,034,808 A | 5/1962 | Poundstone | |
| 3,074,584 A | 1/1963 | Dobell | |
| 3,092,148 A | 6/1963 | Carstens | |
| 3,163,183 A * | 12/1964 | Sagara | F16L 9/04 |
| | | | 138/144 |
| 3,191,289 A | 6/1965 | Fleischer | |
| 3,296,945 A | 1/1967 | Cvacho et al. | |
| 3,366,719 A | 1/1968 | Lueders | |
| 3,483,896 A * | 12/1969 | Grosh | B29C 41/085 |
| | | | 138/141 |
| 3,528,162 A | 9/1970 | Sagara | |
| 3,648,883 A | 3/1972 | Bridenstine | |
| 3,746,050 A * | 7/1973 | Born | B21C 37/123 |
| | | | 138/150 |
| 3,861,883 A * | 1/1975 | Uto | B23K 33/004 |
| | | | 428/638 |
| 4,621,181 A * | 11/1986 | Lachmitz | B21C 37/122 |
| | | | 219/61.6 |
| 4,652,019 A | 3/1987 | von Ahrens | |
| 4,682,632 A * | 7/1987 | Wiedenhoff | F16L 57/02 |
| | | | 138/178 |
| 4,687,690 A | 8/1987 | Menzel | |
| 5,192,623 A * | 3/1993 | Gewelber | B23K 1/19 |
| | | | 52/791.1 |
| 5,460,721 A * | 10/1995 | Goodwin | B01D 29/216 |
| | | | 156/190 |
| 5,484,974 A | 1/1996 | Vellmer et al. | |
| 5,958,602 A | 9/1999 | Usui | |
| 6,405,761 B1 | 6/2002 | Shimizu | |
| 7,065,999 B2 | 6/2006 | Fukuchi | |
| 7,712,487 B2 * | 5/2010 | van de Camp | B31C 3/00 |
| | | | 138/144 |
| 2002/0139160 A1 * | 10/2002 | Price | F16L 9/165 |
| | | | 72/49 |
| 2003/0232162 A1 * | 12/2003 | Renck | B31C 3/00 |
| | | | 428/34.3 |
| 2004/0096604 A1 * | 5/2004 | van de Camp | B65H 75/10 |
| | | | 428/34.2 |
| 2004/0111863 A1 | 6/2004 | Binggeli | |
| 2004/0182500 A1 * | 9/2004 | van de Camp | B31C 3/00 |
| | | | 156/184 |
| 2007/0059467 A1 * | 3/2007 | van de Camp | B31C 3/00 |
| | | | 428/36.3 |
| 2007/0298672 A1 | 12/2007 | Iida | |
| 2009/0288467 A1 | 11/2009 | Berg | |
| 2009/0320953 A1 * | 12/2009 | Fletcher | B32B 1/08 |
| | | | 138/148 |
| 2010/0104782 A1 | 4/2010 | Niu et al. | |
| 2010/0139848 A1 | 6/2010 | Burke et al. | |
| 2012/0000565 A1 | 1/2012 | Bolam et al. | |
| 2012/0073348 A1 | 3/2012 | Prehn | |
| 2014/0311614 A1 | 10/2014 | Edmondson et al. | |

\* cited by examiner

HELICALLY WOUND TUBULAR STRUCTURES

FIELD OF THE INVENTION

The present disclosure provides improved tubular structures and tubular structures having novel features suitable for use as pipes, structural tubes, barrels, and tanks that are formed by helically winding sheet metal about a mandrel that defines the longitudinal axis, interior cross-sectional shape, and interior size of the tubular structure. The present disclosure more particularly provides helically wound tubular structures that can be light weight and/or comprise novel features. These helically wound tubular structures are exceptionally high quality where the starting inside dimension, wall thickness, and exterior dimension are precisely defined and controlled and can have unique features such as combining different materials, high strength-to-weight properties, enclosed insulation zones, secondary fluid passageways, and integrated couplings or other useful components such as sensors.

BACKGROUND OF THE INVENTION

Pipes are long, hollow tubular structures used for a variety of purposes. They are now generally produced by two distinct methods that result in either a welded or seamless pipe. In both methods, raw steel is first cast into a more workable starting form. It is then made into a pipe by stretching the steel out into a seamless tube or forcing the edges together and sealing them with a weld.

As mentioned, tubular structures such as pipe come in generally two configurations—seamless and welded. Both generally have different uses. Seamless tubes are typically lighter-weight and have thinner walls and are generally used for transporting liquids. Welded tubes are heavier, more rigid, have a better consistency, are typically straighter, and generally used for gas transportation, electrical conduit, and plumbing. Typically, they are used in instances when the pipe is not put under a high degree of stress.

The primary raw material in pipe production is steel. Steel is made up of primarily iron. Other metals that may be present in the alloy include aluminum, manganese, titanium, tungsten, vanadium, and zirconium. Some finishing materials are sometimes used during production.

Steel pipes can generally be made by two different processes. The overall production method for both processes involves three steps. First, raw steel is converted into a more workable form (e.g., ingots, blooms, slabs). Next, the pipe is formed on a continuous or semi-continuous production line. Finally, the pipe is cut and modified to meet the customer's needs.

Molten steel is made by melting iron ore and coke (a carbon-rich substance that results when coal is heated in the absence of air) in a furnace. Most of the carbon is removed by blasting oxygen into the liquid. The molten steel is then poured into large, thick-walled iron molds, where it cools into ingots.

To produce a bloom, the ingot is passed through a pair of grooved steel rollers that are stacked. These types of rollers are called "two-high mills." In some cases, three rollers are used. The rollers are mounted so that their grooves coincide, and they move in opposite directions. This action causes the steel to be squeezed and stretched into thinner, longer pieces. When the rollers are reversed by the human operator, the steel is pulled back through making it thinner and longer. This process is repeated until the steel achieves the desired shape. During this process, machines called manipulators flip the steel so that each side is processed evenly.

Blooms are typically processed further before they are made into pipes. Blooms are converted into billets by putting them through more rolling devices which make them longer and narrower. The billets are cut by devices known as flying shears. These are a pair of synchronized shears that race along with the moving billet and cut it. This allows efficient cuts without stopping the manufacturing process. These billets are stacked and will eventually become seamless pipe.

Slabs are also reworked. To make them malleable, they are first heated to 2,200° F. (1,204° C.). This causes an oxide coating to form on the surface of the slab. This coating is broken off with a scale breaker and high pressure water spray. The slabs are then sent through a series of rollers on a hot mill and made into thin, narrow strips of steel called skelp. This mill can be as long as a half mile. As the slabs pass through the rollers, they become thinner and longer. In the course of about three minutes a single slab can be converted from a 6 in (15.2 cm) thick piece of steel to a thin steel ribbon that can be a quarter mile long.

After stretching, the steel is pickled. This process involves running it through a series of tanks that contain sulfuric acid to clean the metal. To finish, it is rinsed with cold and hot water, dried, and then rolled up on large spools and packaged for transport to a pipe making facility.

Both skelp and billets are used to make pipes. Skelp is made into welded pipe. It is first placed on an unwinding machine. As the spool of steel is unwound, it is heated. The steel is then passed through a series of grooved rollers. As it passes by, the rollers cause the edges of the skelp to curl together. This forms an unwelded pipe.

The steel next passes by welding electrodes. These devices seal the two ends of the pipe together. The welded seam is then passed through a high pressure roller which helps create a tight weld. The pipe is then cut to a desired length and stacked for further processing. Welded steel pipe is a continuous process and depending on the size of the pipe, it can be made as fast as 1,100 ft (335.3 m) per minute.

When seamless pipe is needed, square billets are used for production. They are heated and molded to form a cylinder shape, also called a round. The round is then put in a furnace where it is heated white-hot. The heated round is then rolled with great pressure. This high pressure rolling causes the billet to stretch out and a hole to form in the center. Since this hole is irregularly shaped, a bullet shaped piercer point is pushed through the middle of the billet as it is being rolled. After the piercing stage, the pipe may still be of irregular thickness and shape. To correct this, it is passed through another series of rolling mills.

After either type of pipe is made, they may be put through a straightening machine. They may also be fitted with joints so two or more pieces of pipe can be connected. The most common type of joint for pipes with smaller diameters is threading—tight grooves that are cut into the end of the pipe. The pipes are also sent through a measuring machine. This information along with other quality control data is automatically stenciled on the pipe. The pipe is then sprayed with a light coating of protective oil. Most pipe is typically treated to prevent it from rusting. This is done by galvanizing it or giving it a coating of zinc. Depending on the use of the pipe, other paints or coatings may be used.

The characteristics of tubular structures such as pipe can be controlled during production. For example, the diameter of the pipe is often modified depending on how it will be used. The diameter can range from small pipes to large pipes used to transport gas throughout a city. The wall thickness of the pipe can also be controlled with very limited accuracy. Often, the type of steel will also have an impact on the pipe's strength and flexibility. Other controllable characteristics include length, coating material, and end finish. In any regard, it is understood by one of skill in the art that the tubular structures such as pipe made according to the generally understood processes will typically comprise a single homogenous metal, are exceptionally heavy, have limited dimensional accuracy, and are difficult to modify or integrate components therein.

Thus, one of skill in the art understands that there is a clear need to provide a method to manufacture tubular structures, such as pipes, that are lightweight and easy to modify. Further, there is a clear need to provide a layered manufacturing process for tubular structures that can produce exceptionally high quality tubular structures where the starting inside dimension, wall thickness, and exterior dimension can be precisely defined and controlled. Further, there is a need for a layered manufacturing process that can produce unique tubular structures that feature options such as combining different materials, high strength-to-weight properties, enclosed insulation zones, secondary fluid passageways, and integrated couplings or other useful components such as sensors.

SUMMARY OF THE INVENTION

The present disclosure provides for a helically wound tubular structure. The tubular structure comprises a first sheet metal wound about a longitudinal axis, a second sheet metal having voids disposed therein helically wound about the longitudinal axis and coaxially about the first sheet metal, and a third sheet metal helically wound about the longitudinal axis and coaxially about the first sheet metal and the second sheet metal.

The present disclosure also provides for a helically wound tubular structure. The tubular structure comprises a first sheet metal helically wound about a longitudinal axis, a second sheet metal having out-of-plane deformations helically wound about the longitudinal axis and coaxially about the first sheet metal, and a third sheet metal helically wound about the longitudinal axis and coaxially about the first sheet metal and the second sheet metal. The out-of-plane deformations form void volumes disposed between the second sheet metal and the third sheet metal coaxially disposed thereabout.

DRAWINGS

DETAILED DESCRIPTION

As used herein, a "tubular structure" refers to a product that is generally symmetrically formed about a longitudinal axis and often has a high aspect ratio (i.e., the length is much longer than the maximum cross-sectional dimension). A tubular structure may have a cross-section that is circular, rectangular, square, or any other desired shape.

The terms "material machine direction", "material cross-machine direction", and "material Z-direction" are generally relative to the direction of sheet metal 120 travel through a manufacturing process. The "material machine direction" is known to those of skill in the art as the direction of travel of sheet metal 120 through the process. The "material cross-machine direction" is orthogonal and coplanar thereto. The "material Z-direction" is orthogonal to both the machine- and cross-machine directions. The term "process machine direction" is the direction of travel of the helically wound tubular product produced by the process described herein. The term "process cross-machine direction" is orthogonal to the direction of travel of the helically wound tubular product produced by the process described herein.

Sheet Metal Supply Coils and Sheet Metal

Although any re-coilable material can be used (i.e., metal or non-metal), the raw material for the helically wound tubular structures 180 (also referred to herein as tubular structures 180) of the present disclosure is generally provided as a coil of relatively thin sheet metal. A sheet metal is typically provided in a relatively thin form where the Z-direction dimension is substantially less than the machine- and cross-machine direction dimensions. A sheet metal is helically wound about a longitudinal axis defined by a stationary or rotating mandrel. The thickness of the sheet metal may be selected from a wide range of available gauges. In one non-limiting example, the sheet metal has a thickness of 0.002 inches to 0.100 inches (0.051 mm-2.540 mm). The width of the supply coils may also be selected from a wide range of available slit widths. In one non-limiting example, supply coils are used which have a width of 5 inches to 96 inches (0.127 meters-2.438 meters). The sheet metal may be selected to provide the desired properties of the tubular structure. Many metals are suitable and include, but are not limited to, carbon steel, stainless steel, metal alloys, titanium, cobalt, aluminum, brass, and copper. The sheet metal may be prepared using various manufacturing methods known in the art to provide sheet metal with the desired physical properties prior to being wound into supply coils. For example, carbon steel may be provided as cold rolled sheet metal coils, hot rolled sheet metal coils, or galvanized sheet metal coils.

Unwinding

Figure 1:
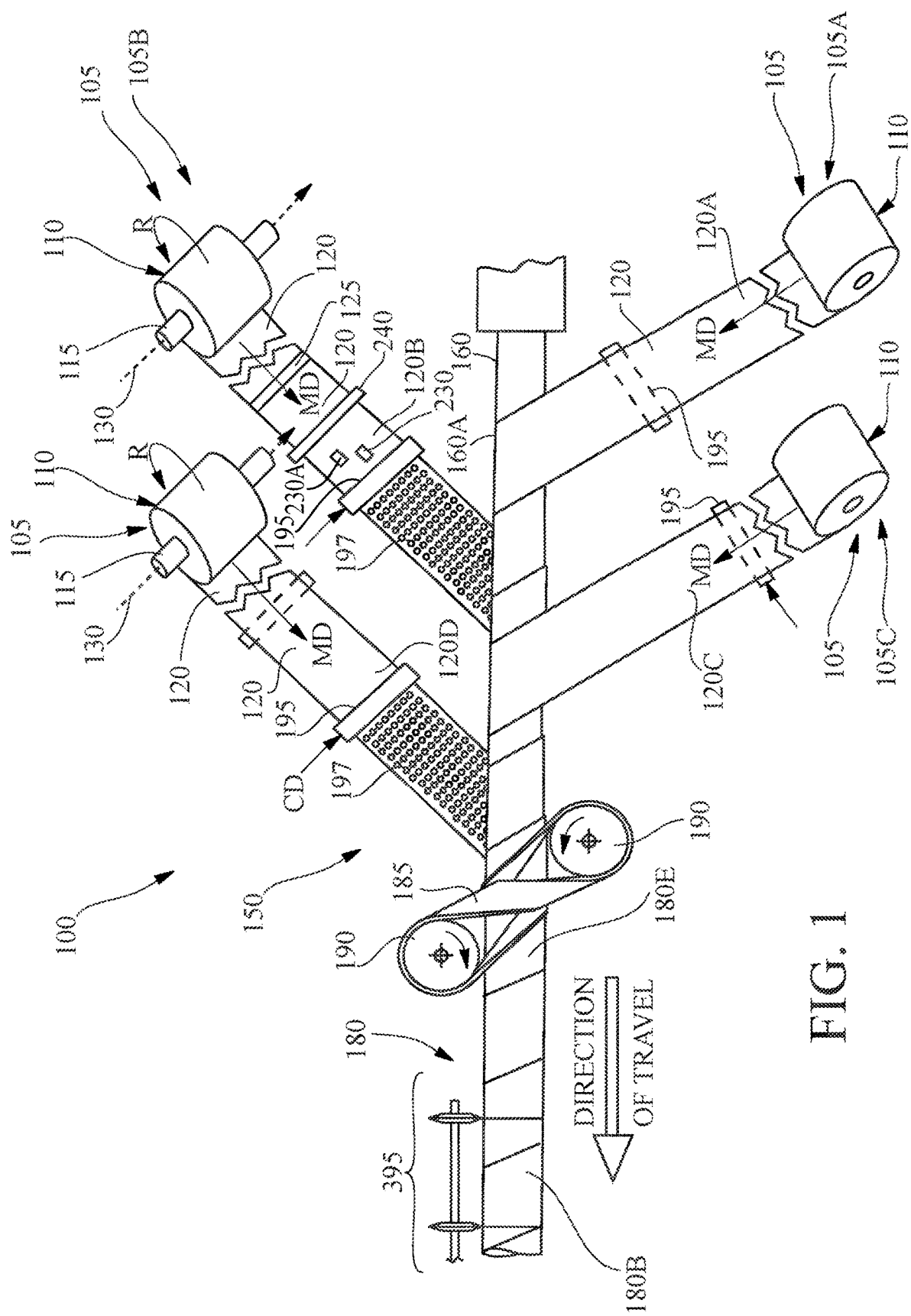
FIG. 1 is a side elevational view of an exemplary process for the manufacture of helically wound tubular structures consistent with the present disclosure.

As shown in FIG. 1, a process for making tubular structures 100 (also referred to herein as manufacturing process 100 and/or process 100) provides for the sheet metal supply coils 105 to be loaded onto a mandrel 115 of an uncoiler apparatus 110 that supports the sheet metal supply coils 105 (also referred to herein as supply coils 105) while rotating them in the direction, R, that unwinds the sheet metal 120 disposed convolutely about the supply coil 105 and feeds the sheet metal 120 to downstream processing operations. The exterior circumferential surface of the supply coil 105 can be supported by rollers 125 positioned underneath the supply coil 105 where the longitudinal axis of each support roller 125 is parallel to the longitudinal axis 130 of the supply coil 105. Each support roller 125 may be driven to rotate and unwind the supply coil 105.

A support mandrel 115 may be inserted through the core of the supply coil 105. The support mandrel(s) 115 can be inserted into a respective supply coil 105 and affixed to the uncoiler apparatus 110 core via mounting arms 135 sized to engage both ends of the core of the supply coil 105. Both ends of the support mandrel 115 may be supported within the uncoiler apparatus 110 and the mandrel may be connected to a motor to rotate the supply coil 105 and unwind the sheet metal 120. Both support rollers 125 and a support mandrel 115 may be used to support the supply coil 105. Other uncoiling or unwinding apparatus configurations known to those of skill in the art may also be used to perform the supply coil 105 unwinding operation.

Sheet Metal Conveying and Web Handling

After the sheet metal 120 is unwound from the supply coil 105, it is conveyed through downstream operations until it is wound in the recoiler 150 to create the desired tubular structure 180. Driven or non-driven rollers and stationary supports (not shown) may be used to support and convey the sheet metal 120 while defining the web path throughout the manufacturing process 100. In a preferred embodiment, the sheet metal 120 processing components are mounted such that their longitudinal axes are level within relatively close tolerances (e.g., level across the entire length+/−0.002 inches or +/−0.051 mm) to ensure consistent tracking of the sheet metal 120 throughout the manufacturing process 100.

In a preferred embodiment, all sheet metal 120 processing components used in the manufacturing process 100 are mounted with their longitudinal axes parallel to one another within relatively close tolerances (e.g. +/−0.002 inches or +/−0.051 mm) to provide consistent tracking of the sheet metal 120 throughout the manufacturing process 100. Tension of the sheet metal 120 can be controlled to provide uniform processing operations. Suitable tension control methods known in the art include, but are not limited to, sheet metal accumulation zones (e.g., a single accumulation loop within a pit between unit operations), sheet metal festoon accumulators, dancers, and load cells which may be used to regulate relative speeds between consecutive unit operations. Other sheet metal tension control techniques known to those of skill in the art may also be used.

In a preferred embodiment, the sheet metal 120 tension can be controlled with load cells that detect the tension and force within the sheet metal 120 at desired location(s) within the process 100, comparing the force to a target, and adjusting the relative speed of any adjacent sheet metal 120 conveying devices used in the manufacturing process 100 to maintain the target force and tension within the sheet metal 120. In this regard, one of skill in the art can provide a suitable tension control algorithm that compares an actual tension in the sheet metal 120 with a desired target tension to determine a tension adjustment factor. The tension adjustment factor can then be applied to the manufacturing process 100 equipment to provide for an adjustment of the speed of the sheet metal 120 by process control equipment to provide for a corrected sheet metal 120 speed and thereby adjust the sheet metal 120 tension. Such a process can be accomplished in-situ or by any off-line process suitable for one of skill in the art.

Winding Mandrels

The process for making tubular structures 100 provides for a sheet metal 120 to be disposed upon and circumferentially wound around a winding mandrel 160 (mandrel 160) at an angle less than 90 degrees relative to the longitudinal axis of the winding mandrel 160. The winding mandrel 160 is a replaceable support that defines the interior cross sectional shape and size of the desired tubular structure 180. The mandrel 160 may be fabricated to provide the desired length, cross-sectional shape, and cross-sectional dimensions of the tubular structure 180 to be produced The mandrel 160 shape may be selected to provide the desired cross-sectional shape of the interior of the tubular structure 180, including but not limited to, circular cross-sections, polygonal cross-sections (e.g., triangular, rectangular and/or square), elliptical cross-sections, and combinations thereof. The cross-sectional dimensions of the mandrel 160 may be selected to provide the desired interior cross-sectional dimensions of the tubular structure 180. For example, the mandrel 160 may be circular and have an outside diameter equal to 1 inch. Alternatively, the mandrel 160 may be circular and have an outside diameter equal to 100 inches. Yet still, the mandrel 160 may be rectangular and comprise outside dimensions equal to 30 inches by 20 inches. The mandrel 160 design is very flexible and can provide a very wide range of tubular structure 180 interior cross sectional shapes and sizes, thereby eliminating a major constraint in prior art fabrication processes for tubular structures 180.

Mandrels 160 can be fabricated from a wide range of materials and by using methods known in the art. Using fabrication capabilities known in the art, mandrels 160 may be produced to provide the desired tubular structure interior dimension to a very accurate level. For example, the mandrel 160 length and cross sectional dimensions can be +/−0.001 inches from the target. Mandrels 160 can be made for each desired cross sectional shape and size combination and re-used during production of tubular structures 180 to have the desired interior cross-sectional shape and size.

Adjustable geometry mandrels 160A comprising similar interior cross-sectional shapes but with different sizes throughout a significant range may be used to produce tubular structures 180. For example, an adjustable circular arbor mandrel 160A, known to one of skill in the art, may be used during the production of round tubular structures 180 having an interior diameter ranging from 12 inches to 16 inches.

Helical (Offset) Winding

Referring again to FIG. 1, winding process 100 comprising helical winding recoiler 150 provides for sheet metal 120 to be helically wound about a longitudinal axis offset at an angle substantially less than 90 degrees relative to the machine direction centerline of the incoming sheet metal 120. This winding configuration can be known as helical, or offset, winding.

Multiple, relatively narrow strips of sheet metal 120 can be fed onto a stationary mandrel 160 at a relative angle of approximately 45 degrees. Each strip of sheet metal 120 is normally wound so adjacent edges are in edge-to-edge contact, leaving no significant gap between adjacent sheet edges and no overlap with the preceding wound strip. Flexible narrow belts are driven by a motor and are wrapped around a significant portion of the winding strips to provide surface driven rotation of the winding sheet metal strips around the mandrel 160 and simultaneous translation of the winding tubular structure toward the downstream end of the mandrel.

The helical winding recoiler 150 is a spiral winding apparatus for making spirally or helically wound tubular structures 180. The winding process 100 comprising helical winding recoiler 150 of FIG. 1 illustrates the manufacture of 4-ply tubular structures 180. However, the principles pertaining to the 4-ply tubular structure 180 are equally applicable to tubular structures 180 having any number of plies, including 1-ply, 2-ply, 3-ply, and the like. The helical winding recoiler 150 provides a cylindrical mandrel 160 or an adjustable geometry mandrel 160A whose diameter is selected to match the desired inside diameter of the tubular structures 180 to be manufactured. A winding belt 185 is arranged to wrap about the tubular structure 180 formed on the mandrel 160 and about a pair of rotating drums 190 that drive the belt 185 so that the belt 185 advances the tubular structure 180 along the mandrel 160 in a screw-like fashion at a substantially constant pitch. A cutting station 395 operably cuts the continuous tubular structure 180 formed on the mandrel 160 into individual tubular structures 180 having the length desired by the operator.

As shown in FIG. 1, four plies of sheet metal 120 are drawn from respective sheet metal supply coils 105 and are advanced toward the mandrel 160 and are sequentially wrapped about the mandrel 160 in radially superposed fashion, one atop another.

Figure 2:
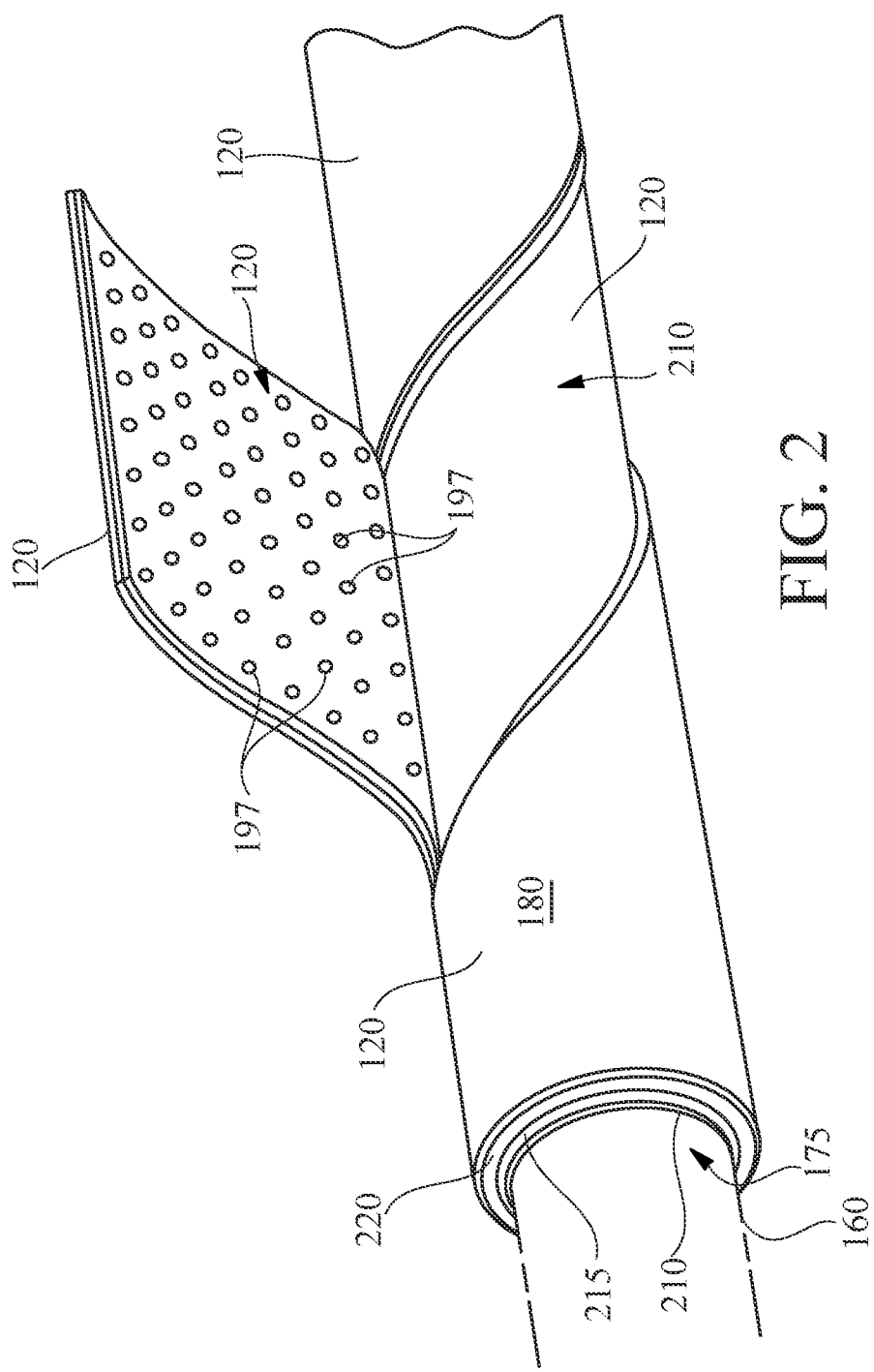
FIG. 2 is a perspective view of an exemplary helically wound tubular structure manufactured with the exemplary process of FIG. 1.

The winding process 100 comprising helical winding recoiler 150 can further provide adhesive applicators 195 for applying adhesive to respective sheet metal 120 strips. The adhesive applicators 195 can be structured and arranged to apply an adhesive to respective sheet metal 120 strips in a partial-coverage pattern 197. The partial-coverage adhesive pattern 197 is characterized by spaced regions of adhesive, which can comprise islands or dots as shown in FIGS. 1 and 2. Alternatively, the adhesive 197 can be applied to the respective sheet metal 120 strips by adhesive applicators 195 as lines (continuous or broken) of adhesive that intersect and form a grid. In any event, there are regions of adhesive 197 that are interspersed with or separated by substantially adhesive-free portions of the surface of the respective sheet metal 120 strips. Preferably, the adhesive regions 197 are spaced apart in both length and width directions of the respective sheet metal 120 strip. The adhesive pattern 197 adheres the external surface of a respective inner ply of a strip of sheet metal 120 to the inner surface of a respective succeeding ply of a strip of sheet metal 120 by bonding to the respective facing surfaces of those plies. The adhesive patterns are shown as being applied to the radially inwardly facing surfaces of a respective inner ply of a strip of sheet metal 120. Alternatively, the adhesive patterns 197 could be applied to the outwardly facing surfaces of a respective inner ply of a strip of sheet metal 120, as will be understood by those skilled in the art.

Each sheet metal strip forms a layer of the desired tubular structure 180. Separate sheet metal 120 strips and any related uncoiling and web handling processes can be required for each sheet metal 120 strip. This manufacturing method can provide an essentially endless stream of formed tubular structure 180 with final lengths determined by a downstream cut-off system. This may be an especially efficient manufacturing method for tubular structures 180 comprising relatively few layers, especially when extended length tubular structures 180 are required, or when very high total lengths of tubular structures 180 are required.

Such a helical winding process may require that any seams and edges be sealed for applications with even modest levels of internal pressure. The required joining of adjacent layers of sheet metal 120 and sealing of the sheet metal 120 edges and seams may be provided by adhesive bonding systems or welding systems described infra.

Interior Dimension, Wall Thickness, and Outer Dimension Flexibility and Accuracy A key advantage of the current invention relative to prior art is the unprecedented flexibility to produce tubular structures 180 with a very wide range of interior dimension, wall thickness, and exterior dimension combinations. As described supra, nearly any desired tubular structure 180 interior cross sectional shape and size can be provided by an appropriately designed winding mandrel 160. Wall thickness is determined by the thickness of incoming sheet materials, the number of incoming sheet materials, and any z-direction deformation imparted to the incoming sheet materials.

In one embodiment, the outer dimensions of the winding tubular structure 180 can be measured throughout the entire winding process 100. Measurement systems are known in the art to continuously measure the outer dimensions of the winding tubular structure 180. For example, a digital micrometer can contact the winding structure and provide an accurate measurement (+/−0.001 inches) of the wound wall thickness. Further, non-contact laser triangulation measurement systems can be used to scan the winding tubular structure 180 and provide an accurate measurement (within 0.001 inches) of the wound wall thickness.

In some applications, it may be desirable to confirm the dimensional accuracy of the manufactured tubular structure. This accuracy may be evaluated by measuring key dimensions of the tubular structure such as inside diameter, wall thickness, outside diameter, and ovality. A test method for measuring these dimensions is below.

Measurement of Tubular Structure Dimensions Using a Pipe Dimension Measurement System:

Prior to Taking any Measurements:

1. Place the tubular structure (tube) in a test stand that can safely support the tube, allow easy rotation of the tube, and provides clearances under the tube for making circumferential measurements along the tube's longitudinal axis.
2. Mark one end of the tube X and the other end Y
3. Position a MIRACLE POINT Model 900-Old Digital Centering Head (available from Newman Tools Inc. of Hartford CT) on the top surface of the tube, at end X, three inches from the end of the tube.
4. Adjust the centering head until the display reads 0.00, indicating the instrument is exactly horizontal.
5. Tap the top of the center punch with a hammer to mark the tube.

6. Repeat the process at several points along the length of the tube, ending at three inches from end Y.
7. Align a straight edge with the center punch marks and draw a fine line along the length of the tube.
8. Mark the line "1".
9. Use a length measuring tape (a recommended model is a 25 foot Series 85 from The Perfect Measuring Tape Company of Toledo, OH) to measure the length of the tube. This is dimension L.
10. Divide L by 4. This is increment M.
11. Using the length measuring tape, make cross-marks on line 1 at 3 inches from end X, M inches from end X, 2×M inches from end X, 3×M inches from end X, and 3 inches from end Y. Label each cross mark with the line number (e.g. "1"), followed by A through E, with A at the X end and E at the Y end.
12. Using a circumference measuring tape (a recommended model is Model DCT120 from The Perfect Measuring Tape Company of Toledo, OH), measure the tube's circumference 3 inches from end X. Divide the circumference by 4. This is increment P.
13. At 3 inches from end X and working clockwise from line 1 when viewed from end X, mark the surface of the tube at P, 2×P, and 3×P increments around the tube's circumference from line 1.
14. Rotate the tube counterclockwise to position the mark made P inches from line 1 at the top. Place the centering head on top of the tube and make slight rotation adjustments to the tube until the centering head reads 0.00 when the head's marking tip aligns with the mark made in step 13.
15. Repeat steps 5, 6, and 7. Mark the line "2".
16. Rotate the tube counterclockwise to position the mark made 2×P inches from line 1 at the top. Place the centering head on top of the tube and make slight rotation adjustments to the tube until the centering head reads 0.00 when the head's marking tip aligns with the mark made in step 13.
17. Repeat steps 5, 6, and 7. Mark the line "3".
18. Rotate the tube counterclockwise to position the mark made 3×P inches from line 1 at the top. Place the centering head on top of the tube and make slight rotation adjustments to the tube until the centering head reads 0.00 when the head's marking tip aligns with the mark made in step 13.
19. Repeat steps 5, 6, and 7. Mark the line "4".
20. Repeat the process for making cross-marks in step 11 for lines 2, 3, and 4.
21. There are now 20 equally spaced points marked on the tube's surface where measurements will be taken. They are labeled 1A, 1B, 1C, 1D, 1E, 2A, 2B, 2C, 2D, 2E, 3A, 3B, 3C, 3D, 3E, 4A, 4B, 4C, 4D, and 4E.

Wall Thickness Measurement

1. Use a wall thickness instrument (38DL PLUS® Ultrasonic Thickness Gage manufactured by Olympus Corporation of Tokyo, Japan) to take wall thickness measurements on the tube.
2. Start at marked location 1A. Enter the desired name for the tube and data set.
3. Hold the instrument in one hand and the sensor in the other hand. Place the sensor against the tube where the location (e.g., 1A) is marked. Press the "Meas" button on the instrument.
4. Repeat step 3 to take thickness measurements at locations B, C, D, and E in the row.
5. Rotate the tube to allow measurement access to Line 2. Repeat Steps 3 and 4.
6. Rotate the tube to allow measurement access to Line 3. Repeat Steps 3 and 4.
7. Rotate the tube to allow measurement access to Line 4. Repeat Steps 3 and 4.
8. Use the interface cable provided with the Olympus gage and download the data set to a computer.
9. Enter the data into an Excel spreadsheet.
10. Calculate the average wall thickness of all 20 wall thickness measurements using the Excel command "AVERAGE". For example, if the 20 data points are in A1:A20, use another cell to calculate the average by entering the formula "=AVERAGE(A1:A20)".
11. Calculate the wall thickness standard deviation for all 20 wall thickness measurements using the Excel command "STDEV". For example, if the 20 data points are in A1:A20, use another cell to calculate the standard deviation by entering the formula "=STDEV(A1:A20)".

Outside Diameter and Ovality

Outside diameter and ovality measurements may be obtained by using a Profile360 laser measurement system, manufactured by Starrett Corporation of Columbus, Georgia Several size ranges are available, and the appropriate size should be selected based on the size of tubular structure to be measured.

1. Place the tube on a roller conveyor, with end X closest to the scanner, such that it can be moved from one side of the laser scanner, through the scanner, and supported on the other side of the scanner.
2. Rotate the tube such that line 1 is at the top. Confirm the center head reads 0.00 when the center punch is aligned with line 1.
3. Start up the scanner and input the target tube outside diameter.
4. Index the tube through the scanner until the entire tube has passed through the scanner.
5. The scanner display panel provides a display of the measurement data, with location data (axially and circumferentially).
6. Download the data to the computer and spreadsheet used for the wall thickness data.
7. Record the average outside diameter of the tube and Out of Round (ovality) of the tube as recorded by the scanner.
8. Use the scanner software or the Excel function as described in Step 11 for wall thickness measurements to determine the standard deviation of the outside diameter and Out of Round (Ovality) measurements.
9. Transfer the outside diameter measurements correlating to each wall thickness measurement location (e.g. 1A, 1B, etc.) into the wall thickness spreadsheet.
10. Calculate the inside diameter at each wall thickness location by using the formula (inside diameter=outside diameter−2×wall thickness).
11. Use the Excel functions for average and standard deviation per Steps 10 and 11 in the wall thickness measurement section to calculate the average and standard deviation for the inside diameter data.

In a preferred embodiment of the present disclosure, the inside diameter, wall thickness, and outside diameter of the tubular structure have a standard deviation of less of than about 1.5% of a respective average measurement for the inside diameter, the wall thickness, and the outside diameter as determined by the Pipe Dimension Measurement system.

Cross-Machine Direction Registration of Sheet Metal Features

In a preferred embodiment, features of helically wound tubular structures 180 may be aligned in the cross-machine direction to maintain relative registration along the tubular structure 180 longitudinal axis 235. For example, discrete voids 230 can be created with a void generation system 240 in the sheet metal 120 by laser cutting prior to winding. The cross-machine direction spacing of the voids 230 can be controlled to ensure the voids 230 are aligned axially after being wound into the tubular structure 180. To ensure the voids 230 remain aligned, means can be implemented to maintain cross-machine direction alignment of such features from the point they are generated in the sheet metal 120 until they are wound into the tubular structure 180.

In one embodiment, in-line leveler and sheet metal 120 tension control mechanisms known in the art can be used to provide a smooth, level sheet under consistent tension. Consistent tension may be maintained from the point where a sheet metal 120 feature such as voids 230 are produced through the manufacturing process 100. In addition, sheet spreading devices such as herringbone spreader rolls and bowed spreader rolls, both known in the art, may be used to spread the sheet metal 120 to further ensure the surface is flat and smooth.

The overall width of the sheet metal 120 may be continuously measured by monitoring the sheet edge position with a non-contact device such as ultrasonic or infrared scanners, both known in the art, at each side of the sheet metal 120. The same devices may be used to compare the sheet edge position to a desired edge position. This information can be used to control an uncoiler 110 sidelay device, known in the art to be capable of moving the supply coil 105 of sheet metal 120 in the cross machine direction, to maintain a centered sheet alignment or to maintain one sheet edge at a target cross machine position.

Any combination of the above devices may be used to control the sheet metal 120 as it is processed. In a preferred embodiment, all the mechanisms are used to maintain a smooth, flat sheet metal 120 surface, control the sheet tension to a uniform level, and align at least one sheet edge to a target cross machine position. The cross-machine direction alignment of sheet features may be controlled and maintained from the point they are introduced into the sheet metal 120 until they are wound into the tubular structure 180 in the recoiler 150. Cross machine direction registration from one portion of a helically wound structure to an adjacent portion of the helically wound structure requires an angular offset in the feature which corresponds to the angle of the sheet metal infeed relative to the longitudinal axis of the winding mandrel and machine direction spacing control of the feature that corresponds to the diameter of the winding tubular structure for that layer of sheet metal.

Machine Direction Registration of Sheet Metal Features

The machine direction spacing of some features of helically wound tubular structures 180 may be controlled to maintain relative registration in the circumferential direction within a rewound tubular structure 180.

The machine direction spacing of discrete circular voids can be increased from the first generated void to each successive void within the pipe. The increase in machine direction spacing between a first void and a second successive void that overlies the first void may be pre-determined and based on the thickness of the sheet metal and the diameter of the pipe at that point in the winding process.

One skilled in the art may use this procedure, or a suitably modified procedure, to control the machine direction spacing of sheet metal features to maintain any desired circumferential registration of such features once they are rewound into a tubular structure.

Multi-Material Construction

A helically wound tubular structure 180 can be produced by helically winding a single sheet metal 120 on a mandrel 160 that determines the longitudinal axis 235 of the tubular structure 180. A first sheet metal 120A is supplied in a first sheet metal supply coil 105A, unwound, conveyed, and rewound into a desired tubular structure 180 comprised entirely from the first sheet metal 120A. The rewound layers of sheet metal 120A can be constrained by an adjustable pressure roll 170 during or after winding to prevent uncoiling of the resulting rewound tubular structure 180. Alternatively, adjacent edges of sheet metal 120A may be adhesively bonded or welded after winding to prevent uncoiling of the resulting rewound tubular structure.

Figure 3:
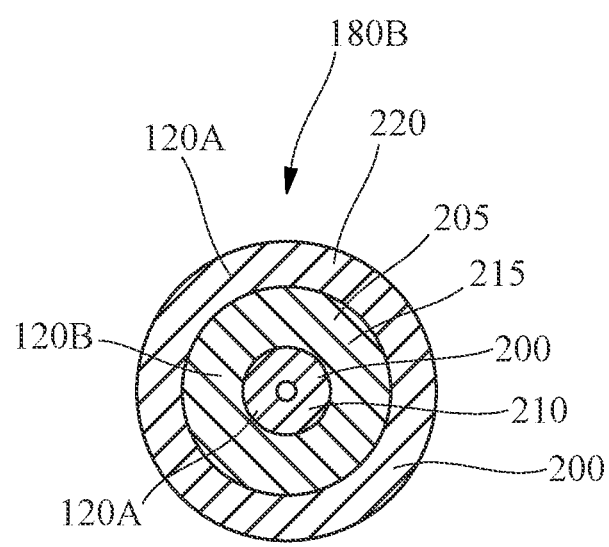
FIG. 3 is a cross-sectional view of an exemplary helically wound tubular structure.

As shown in FIGS. 1 and 3, a tubular structure 180, 180B can be produced by sequentially winding at least two sheet metals 120A, 120B comprising different metal materials, on a mandrel 160 that forms the longitudinal axis 235 of a tubular structure 180, 180B. A first sheet metal 120A, comprising a first metal material 200, is supplied in a first supply coil 105A, unwound, conveyed, and rewound into a first inner region 210 of a desired tubular structure 180, 180A. At least a portion of adjacent helical windings disposed within the first inner region 210 of the desired tubular structure 180, 180A can be adhesively bonded or welded together during the manufacturing process. The first inner region 210 of the tubular structure 180B can have a desired thickness.

A second sheet metal 120B, comprising a second metal material 205, is supplied in a second supply coil 105B. A leading edge of the second sheet metal 120B is prepared with a generally straight edge in the cross-machine direction and conveyed to the recoiler 150 and adhesively bonded or welded to the outer surface of first metal material 200 comprising the first inner region 210 of the helically wound tubular structure 180B. The second sheet metal 120B is then rewound into a middle region 215 of the desired tubular structure 180B. At least a portion of adjacent helical windings within the middle region 215 can be adhesively bonded or welded 195 together during the winding process 100. The middle region 215 of the tubular structure 180B can have a desired thickness.

The first metal material 200 comprising the first sheet metal 120A is then supplied by a third supply coil 105A. A leading edge of the first sheet metal 120A is prepared and conveyed to recoiler 150 and attached via an adhesive or welded bond 195 to the outer surface of the middle region 215 of tubular structure 180B. The first sheet metal 120A is then rewound about middle region 215 into a third region 220 of the desired tubular structure 180B. At least a portion of adjacent helical windings within the third region 220 can be adhesively bonded or welded [195] together during the process 100. The third region 220 of the tubular structure 180B can have a desired thickness.

Third region 220 can provide the ultimate (e.g., outer) region of tubular structure 180. However, for purposes of this disclosure, it should be understood that third region 220 can reside intermediate any additional regions disposed coaxially thereabout that may be required for the desired tubular structure 180. Merely for purposes of simplicity, this disclosure will refer to tubular structures 180 having a first inner region 210, middle region 215, and third region 220 with the understanding that additional regions can be provided as required.

The resulting tubular structure 180B comprises at least a first sheet metal 120A and a second sheet metal 120B. The first sheet metal 120A is used to form the first inner 210 and third 220 regions of the resulting tubular structure 180B and the second sheet metal 120B is used to form the middle region 215 of the resulting tubular structure 180B. This bi-metallic form of the tubular structure 180B can offer significant advantages since the first 200 and second 205 metal materials may be independently selected for optimum cost and performance which are best suited for the requirements of the specific region (i.e. inner, middle, or outer) of the helically wound tubular structure 180B. For example, stainless steel may be used to provide corrosion resistance for both the interior and exterior regions of a pipe (i.e., first inner region 210 and third region 220) while low cost carbon steel can be used to form the middle region 215 of the pipe (i.e., helically wound tubular structure 180B), thereby providing desired performance at a lower cost.

Referring again to FIGS. 1 and 3, a tubular structure 180B can be produced by helically winding at least one sheet metal and at least one sheet of a sheet material other than metal to form a resulting tubular structure 180B. A first sheet metal 120A supplied in a first sheet metal supply coil 105A is unwound, processed, and rewound into a first inner region 210 of tubular structure 180B. A second sheet comprising a sheet material other than metal 225 is supplied in a second coil 105B, unwound, processed, and rewound into a middle region 215 of tubular structure 180B. By way of non-limiting example, a sheet material other than metal 225 could comprise paperboards, cardboards, polymer sheets, fabrics, composites, elastomers, leathers, forms, and the like. The first sheet metal 120A supplied from the first sheet metal supply coil 105A is then unwound, processed, and rewound into a third region 220 of the desired tubular structure 180B. In this embodiment, the resulting helically wound tubular structure 180B comprises at least two materials—a first metal used to form first inner 210 and third 220 regions of tubular structure 180B and a second sheet comprising a sheet material other than metal 225 used to form the middle region 215 of tubular structure 180B. This bi-material form of the tubular structure 180B can offer significant advantages as the first and second materials may be independently selected for optimum cost and performance which are best suited for the requirements of the specific region (i.e. inner, middle, or outer) of the tubular structure 180B. For example, stainless steel may be used to provide corrosion resistance for both the first inner region 210 (i.e., interior) and third region 220 (i.e., exterior regions) of a pipe wall while low cost paperboard can be used to form the middle region 215 of the pipe wall to provide a desired performance at lower cost. It may be preferable to bond at least a portion of adjacent layers within the first inner 210, middle 215, and third 220 regions of tubular structure 180B. For example, the layers can be bonded with adhesive or with laser welding.

In yet another embodiment, a radial gap can be provided between adjacent layers of sheet metal of at least 0.002" or at least 0.003" or at least 0.004". The radial gap may be determined by controlling the use of discrete particles disposed between respective adjacent layers of the tubular structure 180B. The desired radial gap may be controlled by the dimension(s) of the discrete particles disposed between adjacent layers, the discrete particle application rate per unit area between adjacent layers, or any combination thereof.

By way of example, a tubular structure 180 can be produced by sequentially winding at least two sheet metals 120, 120A, as well as any of 120B, 120C, 120D on a mandrel 160 that forms the longitudinal axis 235 of a tubular structure 180. A first sheet metal 120, comprising a first metal material 200, is supplied in a first supply coil 105, unwound, conveyed, and rewound into a first inner region 210 of a desired tubular structure 180. At least a portion of adjacent helical windings disposed within the first inner region 210 of the desired tubular structure 180 can be welded 195 together during the manufacturing process 100. A plurality of discrete particles can be disposed upon the outwardly facing surface of the first inner region of tubular structure 180.

A second sheet metal 120A, comprising a second metal material 205, is supplied in a second supply coil 105B. A leading edge 175 of the second sheet metal 120B is prepared with a generally straight edge in the cross-machine direction and conveyed to the recoiler 150 and welded 195 to the outer surface of first metal material 200 comprising the first inner region 210 of the helically wound tubular structure 180. The second sheet metal 120A is then rewound to overlay the first sheet metal 120 and the discrete particles disposed thereon to form the desired tubular structure 180. At least a portion of adjacent helical windings can be welded 195 together during the winding process 100.

It has been surprisingly found that this bonding configuration can provide a desirable improvement in insulation capability in the wall of the resulting tubular structure due to the resulting air gap disposed between radially adjacent layers of sheet metal. This improvement in insulation capability can reduce or eliminate the need for supplemental exterior or integrated insulation and provide significant cost savings. It has also been found that this bonding configuration can provide a desirable improvement in dampening within the wall of the resulting tubular structure, thus minimizing propagation of vibration and noise through the pipes.

Coaxial Void Creation

In a helically wound structure, features may be aligned in the process machine direction and the process cross-machine direction by appropriately registering corresponding features in separate sheet metals fed into the winding tubular structure in the material machine and cross-machine directions. In a typical helical winding process, each sheet metal forms the entirety of a specific layer within the tubular structure as each respective sheet metal is wrapped about the longitudinal axis of the winding tubular structure.

A feature, such as a void, disposed within one layer of a helically wound structure can be circumferentially registered with other features within the same layer by controlling the material machine and cross-machine spacing of the feature within the sheet metal which forms that layer. The material machine direction spacing of the feature should equal the circumference of the tubular structure at that point in the wind divided by the cosine of the sheet metal in-feed angle. The in-feed angle is the difference between the material machine direction of the sheet metal and the process cross-machine direction (i.e., plane perpendicular to the longitudinal axis) of the resulting tubular structure. The material cross-machine direction spacing should be held constant within the sheet metal.

Further, the material cross-machine position of the desired feature may be changed between successive features. In such embodiments, the material machine direction spacing of the feature must also be changed to maintain circumferential alignment. The change in the material machine direction spacing of the feature can correspond to the increase or decrease in material machine direction spacing related to the material cross-machine direction change of the feature. This can generally be determined as the material cross-machine direction change of the feature multiplied by the sine of the sheet metal in-feed angle. The material cross-machine direction change of the desired feature is a negative value if the feature is moved toward the side of the sheet metal that has a longer distance to the longitudinal axis of the resulting tubular structure.

Tubular structures having improved strength-to-weight properties may be desired and/or required. Here, at least a portion of the helically wound tubular structure may be formed with a net structural density that is substantially less than the density of the constituent sheet metal material used to form the tubular structure. The reduced density portion of the tubular structure wall may be designed to optimize any desired mechanical property or combination of mechanical properties of the tubular structure. This includes, but is not limited to, mass, weight, shear strength, axial tensile strength, axial compression strength, torsional strength, modulus of elasticity in a desired plane or orientation, internal pressure rating, and external pressure rating.

Figure 4:
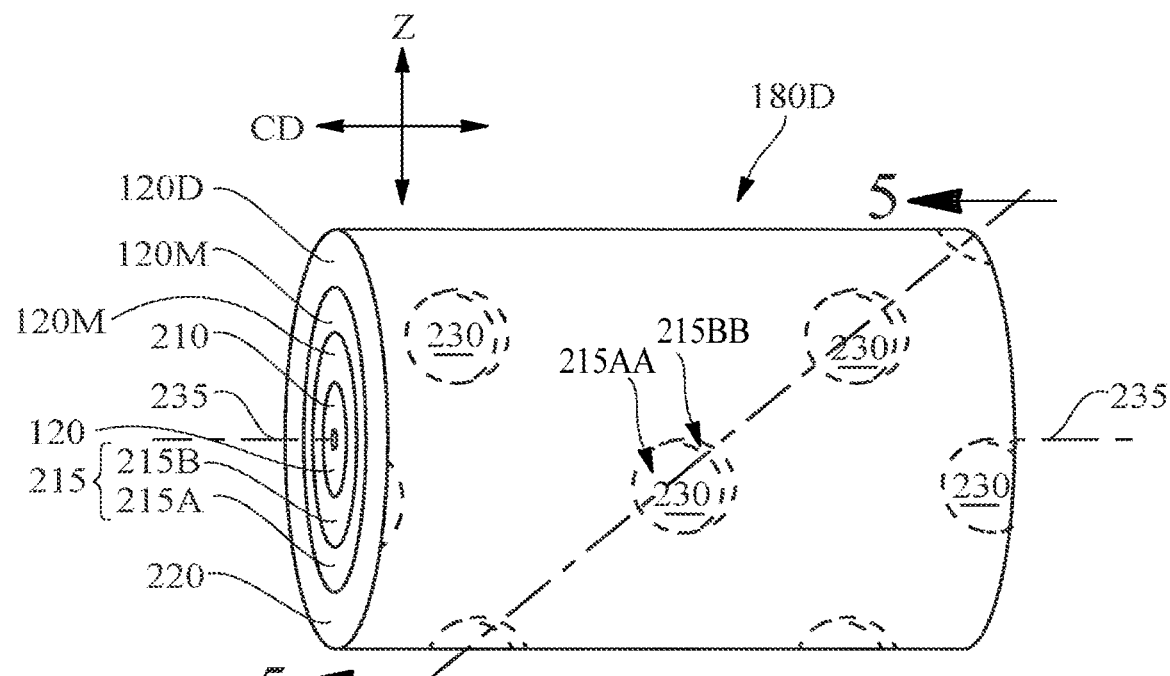
FIG. 4 is an elevational view of yet another helically wound tubular structure.
Figure 5:
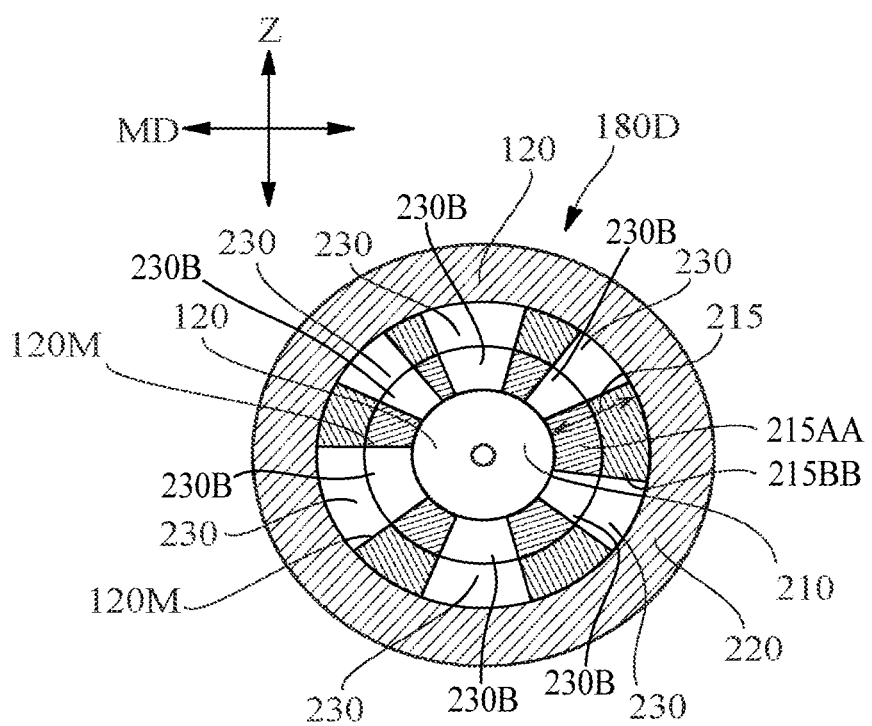
FIG. 5 is a cross-sectional view of the helically wound tubular structure of FIG. 4 taken along line 5-5.

FIGS. 4 and 5 provide an exemplary tubular structure 180D with improved strength-to-weight properties. The tubular structure 180D may be produced by helically winding a sheet metal comprising pre-formed voids 230 to form at least a portion of the tubular structure 180D. For example, a first inner region 210 of the tubular structure 180 can be formed by helically winding a homogenous sheet metal around the longitudinal axis 235 of the tubular structure 180. A middle region 215 of the tubular structure 180D is then formed by winding a second sheet metal having pre-formed voids 230, such as circles, around the first inner region 210 about the longitudinal axis 235 of the tubular structure 180D by overlying the first sheet metal. A perforated sheet metal having a total void area of 30% to 80% can be used to form at least a portion of the middle region 215 of the tubular structure 180D. A third region 220 of the tubular structure 180D is then formed by winding the first homogenous sheet metal around middle region 215 about the longitudinal axis 235 of the tubular structure 180D and overlying the second sheet metal to attain the desired wall thickness and the desired outer dimensions of the tubular structure 180D. The tubular structure 180D formed in this manner can have a surprisingly substantially lower total mass with a relatively minor decrease in strength, modulus of elasticity, and pressure rating. In an alternative embodiment, the middle region 215 may comprise two or more layers of sheet metal, wherein each layer is formed by unwinding sheet metal from a separate supply coil. At least a portion of said layers of sheet metal in the middle region 215 may comprise pre-formed voids. These types of improved strength-to-weight tubular structures 180D may be especially useful in aeronautical, space, and inter-stellar applications.

Figure 6:
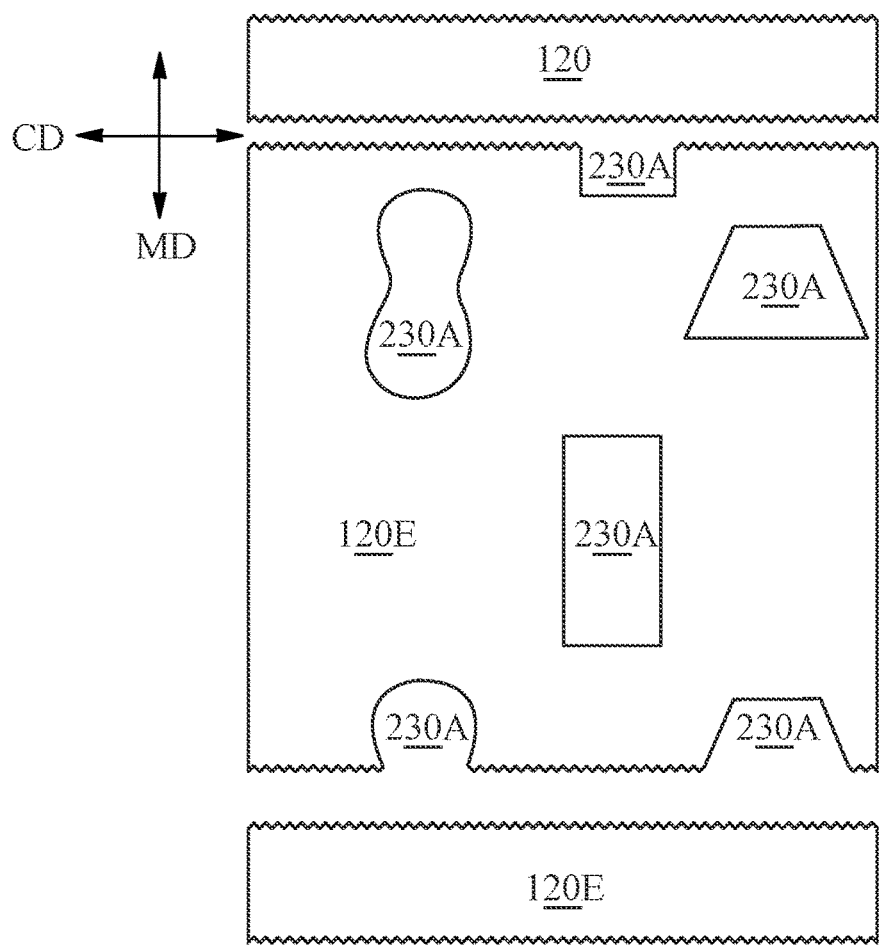
FIG. 6 is a plan view of an exemplary sheet metal.
Figure 7:
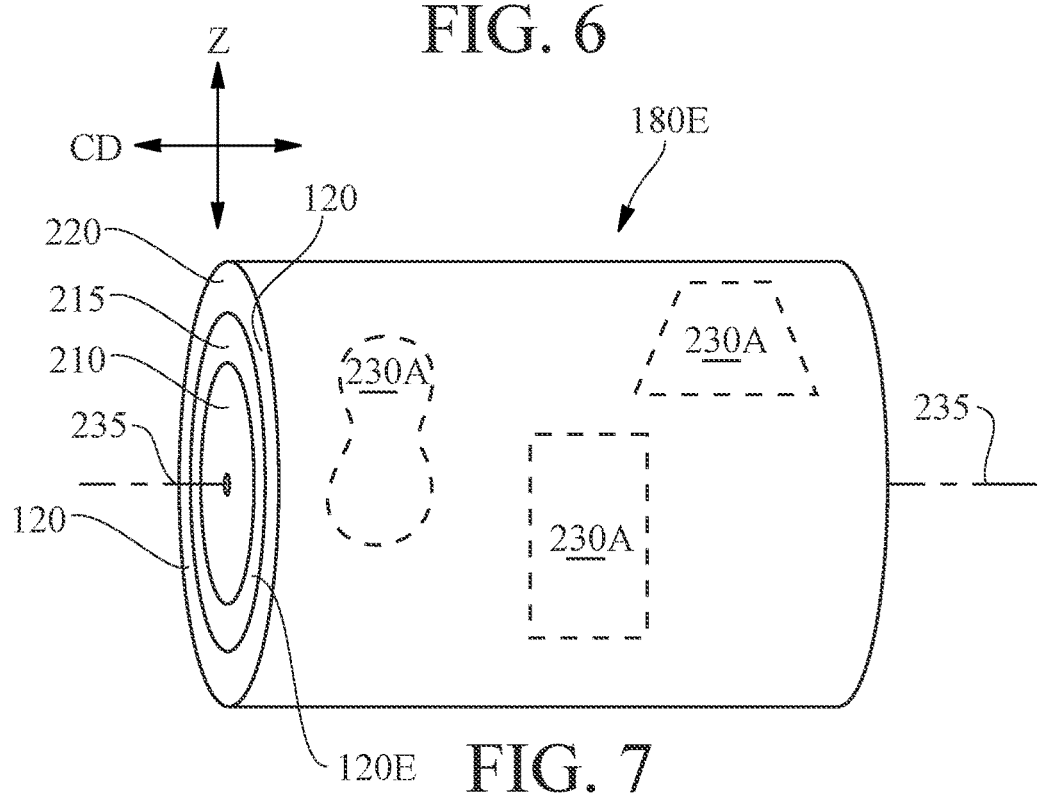
FIG. 7 is an elevational view of a helically wound tubular structure manufactured from the sheet metal of FIG. 6.

As shown in FIGS. 6 and 7, a tubular structure 180E with improved strength-to-weight properties may be produced by unwinding a homogenous sheet metal 120, forming voids in situ in selected portions of the sheet metal 120 with a void generation system 240 to form a sheet metal 120E portion having voids disposed therein, and then winding the sheet metal 120E into tubular structure 180E. A first sheet metal 120 supplied in a first sheet metal supply coil 105 is unwound in an uncoiler apparatus 110 and fed into a downstream recoiler 150 where it is helically wound to form the first inner region 210 of the tubular structure 180E. After the first inner region 210 of the tubular structure 180E is formed, voids 230A are generated in the sheet metal 120 to form a sheet metal 120E having voids disposed therein prior to winding the sheet metal 120E to form the middle region 215 of tubular structure 180E.

Voids 230A can be generated to form sheet metal 120E portion by mechanical contact operations such as punching or cutting. The punching or cutting operations may remove discrete portions of sheet metal 120E to reduce mass while still maintaining substantial material continuity in both the material machine- and cross-machine directions. Alternatively, voids 230A can be generated to form sheet metal 120E by non-mechanical cutting operations such as water jet cutting or laser cutting. Water jet and laser cutting systems are known in the art and can be effective in cutting sheet metal. Both water jet and laser cutting systems also have advantages for quickly and easily changing the void size, shape, or spacing. Since no mechanical tooling is used in these systems, they are more flexible and can quickly make changes via programming to control the position of the device that cuts the sheet metal. Other metal cutting techniques known in the art may also be used to generate voids 230A. The position, size, shape, and spacing of the discrete voids 230A can be selected to provide a reduced mass and preservation of mechanical properties such as strength, modulus of elasticity, and pressure rating. After the middle region 215 of the tubular structure is formed with the sheet metal 120E, a homogenous first sheet metal 120 can then be wound to form the third region 220 of the tubular structure 180E. It may be preferable to bond at least a portion of the adjacent layers within the inner 210, middle 215, and outer 220 regions of the tubular structure 180E as discussed supra. The tubular structure 180E can have substantially lower total mass with a relatively minor decrease in strength, modulus of elasticity, and pressure rating. This type of improved strength-to-weight tubular structure 180E may be especially useful in aeronautical and space applications.

Figure 8:
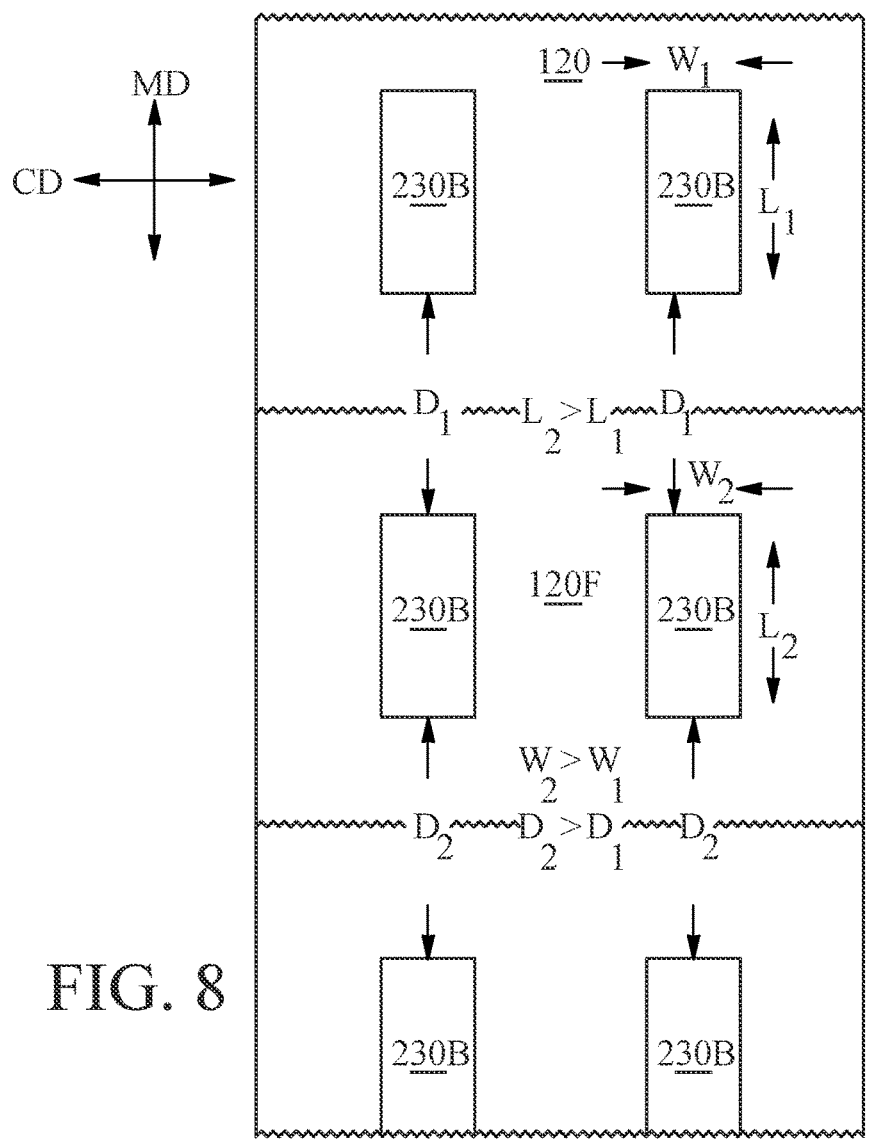
FIG. 8 is a plan view of another exemplary sheet metal.
Figure 9:
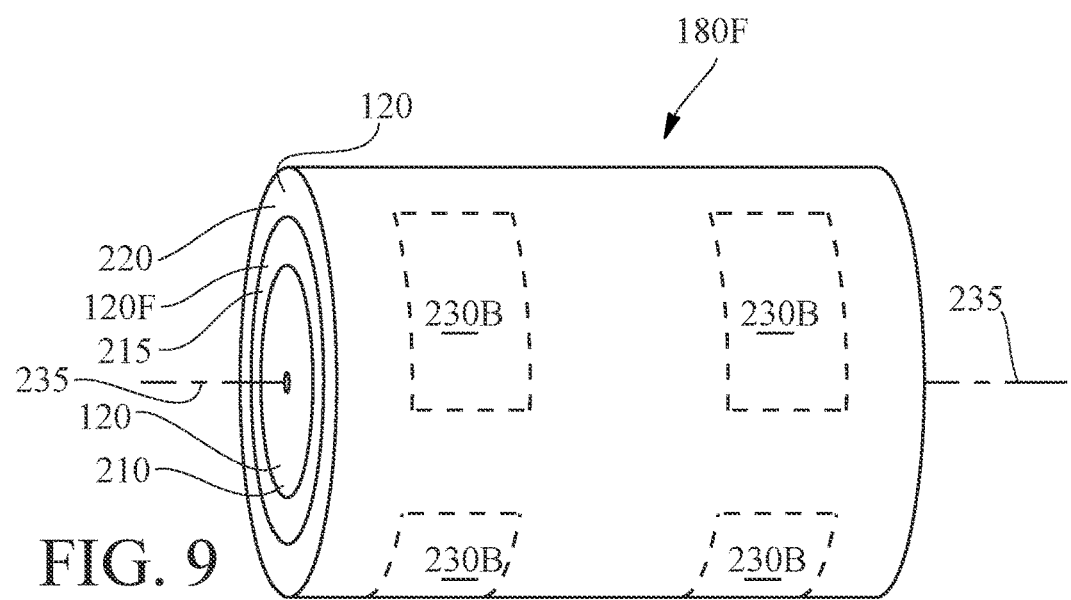
FIG. 9 is an elevational view of a helically wound tubular structure manufactured from the sheet metal of FIG. 8.

Alternatively, as shown in FIGS. 8 and 9, a tubular structure 180F with improved strength-to-weight properties may be produced by unwinding a homogenous sheet metal 120, forming voids 230B in the sheet metal 120 to form a sheet metal 120F, and winding the first sheet metal 120F into a tubular structure 180F as discussed supra. A laser cutting system may be controlled to create any desired void 230B position, size, and shape. The material machine direction void 230B spacing and cross machine void spacing may also be controlled. The angular orientation of the voids within sheet metal 120 may also be controlled to ensure the desired angular orientation of the voids 230B relative to the tubular structure 180F are achieved after the sheet metal 120 is helically wound about the winding mandrel's longitudinal axis. Voids 230B can be generated in the sheet metal 120 to form relatively high aspect ratio rectangles with their maximum dimension generally parallel to the longitudinal axis 235 of the tubular structure 180F.

The voids 230B, 230 can be disposed within the sheet metal 120F so a first of the voids 230B disposed in a middle region 215 layer 215AA of the sheet metal 120F is overlaid by a second of the voids 230 disposed within an immediately succeeding middle region layer 215BB of the sheet metal 120F. Further, the material machine direction spacing $D_1$, $D_2$ of the voids 230B, 230, respectively, can be increased for succeeding voids 230B, 230 in succeeding middle region 215 layers 215AA, 215BB so that a void 230 in a succeeding middle region 215 layer 215BB overlays a preceding void 230B in a preceding middle region 215 layer 215AA when wound into the tubular structure 180F when several layers are used to form middle region 215. The material machine direction void spacing increase (i.e., $D_2 > D_1$) can be proportional to the thickness of the first metal material 200 forming sheet metal 120 and may be pre-determined and programmed into the laser cutting system by means known in the art. The material machine direction length $L_1$, $L_2$ of the voids 230B can be increased for succeeding voids 230 disposed within succeeding layers forming middle region 215 so that a succeeding void 230 overlays a preceding void 230B when wound into the tubular structure 180F. Additionally, the material machine direction void length increase (i.e., $L_2 > L_1$) can be proportional to the thickness of the first metal material 200 forming sheet metal 120 and may be pre-determined and programmed into the laser cutting system by means known in the art. Further, voids 230B, 230 can be axially aligned and circumferentially aligned by controlling the angle of the voids within each sheet metal, the infeed angle of each sheet metal relative to the winding mandrel, and the material machine direction registration of the voids in each sheet metal relative to the voids in adjacent layers of sheet metal, thus creating continuous structural regions in the axial direction which provide a tubular structure 180F with a relatively high cross-sectional moment of inertia and correspondingly low axial deflection.

The material cross-machine direction width $W_1$, $W_2$ of the voids 230 can also be increased for succeeding voids 230B disposed within succeeding layers forming middle region 215 so that a succeeding void 230B overlays a preceding void 230 when wound into the tubular structure 180F. Additionally, the material cross-machine direction void 230B width increase (i.e., $W_2 > W_1$) can be proportional to the thickness of the first metal material 200 forming sheet metal 120 and may be pre-determined and programmed into the laser cutting system by means known in the art. Further, voids 230B, 230 can be axially aligned and circumferentially aligned by controlling the angle of the voids within each sheet metal 120, the in-feed angle of each sheet metal 120 relative to the winding mandrel 160, and the material cross-machine direction registration of the voids 230B in each sheet metal 120 relative to the voids 230 in adjacent layers of sheet metal 120. This creates continuous structural regions in the axial direction which provide a tubular structure 180F with a relatively high cross-sectional moment of inertia and correspondingly low axial deflection. Without desiring to be bound by theory, it stands to reason that a tubular structure 180F formed in this manner has substantially lower total mass with a relatively minor decrease in strength, modulus of elasticity, and pressure rating. This type of improved strength-to-weight tubular structure 180F may be especially useful in aeronautical and space applications.

In a first example, circular voids can be disposed and registered in multiple layers of a helically wound tubular structure to form a circular bore. Here, circular voids can have a first diameter and a constant material machine- and cross-machine direction position within each respective sheet metal. Voids having a first material machine direction spacing are generated in a first sheet metal and wound into a first layer of the helically wound tubular structure. A second sheet metal having circular voids is helically wound into a second layer of the helically wound tubular structure. The material machine direction spacing of the second set of voids is greater than the first set of voids by an amount that corresponds to the increased radial distance occupied by the second sheet metal within the helically wound tubular structure. The circumferential phasing of the second voids may also be controlled to overly the first voids. Successive layers of sheet metal may also comprise circular voids and be similarly controlled to overlay preceding voids in underlying layers. The resulting void volume is a circular bore comprising a constant cross-section and oriented such that the longitudinal axis of the bore is perpendicular to the longitudinal axis of the helically wound tubular structure.

In a second example, square voids can be disposed and registered in multiple layers of a helically wound tubular structure to form a square bore. Here, a set of first voids comprising a first material machine direction spacing is generated in a first sheet metal and wound into a first layer of the tubular structure to form a helically wound tubular structure. A second set of square voids can be generated in a second sheet metal. The material machine direction spacing of the second set of voids is increased to account for the increased radial distance occupied by the second sheet metal within the helically wound tubular structure. The second sheet material is then wound into a succeeding layer to overlay the first layer of the helically wound tubular structure. The circumferential phasing of the voids disposed within the second sheet metal can be controlled to overlay the voids disposed in the first sheet metal. Additional layers of sheet metal can also comprise additional square voids and be controlled to overlay preceding voids in underlying layers within the helically wound tubular structure. The resulting void volume is a square bore comprising a constant cross section and oriented such that the longitudinal axis of the bore is perpendicular to the longitudinal axis of the helically wound tubular structure.

Z-Direction Out-of-Plane Deformation of the Sheet Metal

Figure 10:
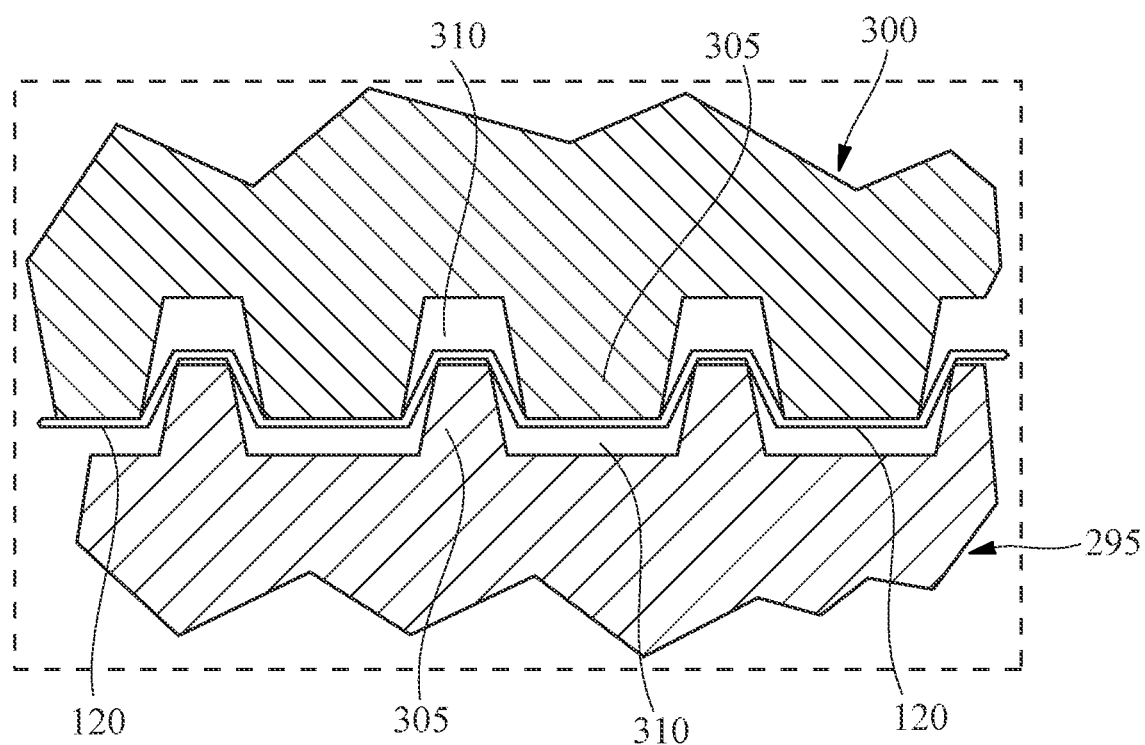
FIG. 10 is a partial side cross-sectional view of an exemplary process for creating protuberances and recesses in a sheet metal.
Figure 11:
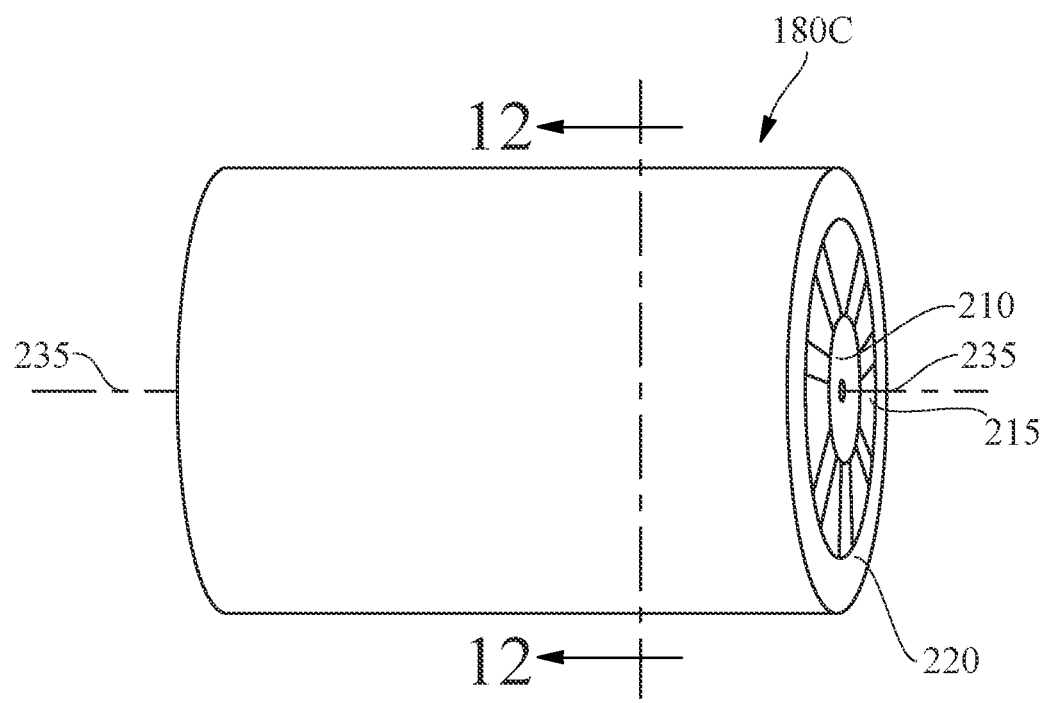
FIG. 11 is a perspective view of still another helically wound tubular structure.
Figure 12:
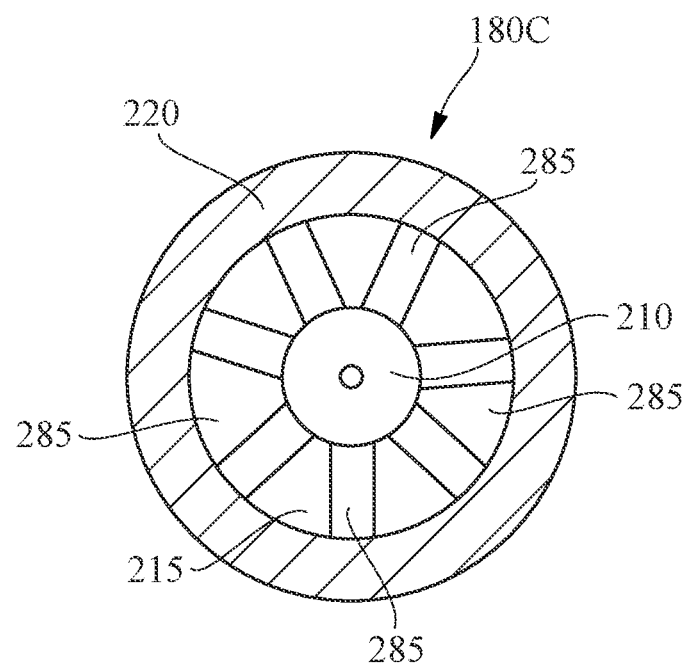
FIG. 12 is a cross-sectional view of the helically wound tubular structure of FIG. 11 taken along lines 12-12.

Referring to FIGS. 10-12, an additional component of the manufacturing process 100 for improved strength-to-weight tubular structures 180C uses out-of-plane deformation of the sheet metal 120 which is subsequently wound to form the tubular structure 180C. An out-of-plane deformed sheet metal 120 can create void volumes 285 between subsequent layers of sheet metal 120 within the helically wound tubular structure 180. These void volumes 285 can reduce mass without significant degradation of physical properties such as strength, modulus of elasticity, and pressure rating. In a preferred embodiment, the out-of-plane, or z-direction, deformation is attained by passing the sheet metal 120 through a nip 290 formed by engaging a first pattern roll 295 with a second pattern roll 300. The entire width of the sheet metal 120 is subject to the deformation process. In an alternative embodiment, only a portion of the width of the sheet metal 120 is subject to the deformation process.

The first 295 and second 300 pattern rolls have corresponding 3-D patterns of protrusions 305 and recessions 310 engraved on the peripheral surfaces thereof. The pattern rolls 295, 300 are inter-engaged with each other to provide preferably a multiplicity of individual engaging configurations formed by the individual corresponding protrusions 305 and recessions 310 of the pattern rolls 295, 300 during the rotation thereof, wherein preferably each protrusion 305 of the engraved embossing pattern of one of the rolls 295, 300 at some portion of rotation becomes inter-engaged with a corresponding recession 310 of the opposite roll 300, 295 such as to form preferably a substantially non-contacting relationship between the inter-engaged corresponding protrusion 305 and recession 310. The non-contacting relationship includes a full engagement position, when the corresponding individual protrusion 305 and recession 310 of the inter-engaged pattern rolls 295, 300 become aligned with each other and with the opposing axes of rotation of the pattern rolls 295, 300 respectively. The full engagement position includes desired clearance(s), enough to accommodate the desired thickness of the sheet metal 120 to be deformed between the inter-engaged protrusions 305 and recessions 310 of the rotating pattern rolls 295, 300. The first pattern roll 295 has a first deformation pattern engraved on the peripheral surface thereof, comprising protrusions 305 and recessions 310. The second pattern roll 300 has a second deformation pattern engraved on the peripheral surface thereof, comprising recessions 310 and protrusions 305. The protrusions 305 of the first pattern roll 295 engage with the corresponding recessions 310 of the second pattern roll 300, and similarly, the recessions 310 of the first pattern roll 295 engage with the corresponding protrusions 305 of the second pattern roll 300.

Corresponding protrusions 305 and recessions 310 become inter-engaged with each other to form the full engagement position and a resulting deformation of the sheet metal 120 in accordance with the present invention are preferably inter-engaged such that they are separated from each other by desired clearance(s) therebetween, such as sidewall clearances and radial clearances. For instance, a sidewall clearance can be formed between the sidewalls of the corresponding inter-engaged protrusions 305 and recessions 310. Further, a first radial clearance can be formed between the top surface of the protrusions 305 of the first pattern roll 295, defining an outermost peripheral surface of the first roll 295, and the bottom surface of the corresponding recessions 310 of the second pattern roll 300, defining an innermost peripheral surface of the second pattern roll 300. Similarly, a second radial clearance can be formed between the bottom surface of the recessions 310 of the first pattern roll 295, defining the innermost peripheral surface of the first pattern roll 295, and the top surface of the corresponding protrusions 305 of the second pattern roll 300, defining the outermost peripheral surface of the second pattern roll 300.

Any desired pattern may be engraved on the first pattern roll 295, with a correspondingly complementary pattern engraved on the second pattern roll 300. In a preferred embodiment, the patterns are selected to provide the desired out-of-plane deformation. The selected patterns may optimize the z-direction deformation distance, the size and shape of individual deformations, the spacing of deformations from one another, and the total deformation area and the resulting void volume 285 area created in middle region 215. Deformations may be made out-of-plane in one direction from the central plane of the sheet metal 120 or in both directions. The deformation size and spacing may be controlled to allow nesting of a first deformation with an overlying second deformation in the rewound tubular structure 180C, wherein the radial distance between the centroid plane of adjacent layers of sheet metal in a nested region is less than the radial distance between the centroid plane of adjacent layers of sheet metal in a non-nested region. The deformation size and spacing may also be selected to prevent nesting.

Engagement between the first pattern roll 295 and the second pattern roll 300 may be controlled by adjusting the relative position of the first pattern roll 295 bearing housings to the second pattern roll 300 bearing housings. In a non-limiting example, the first pattern roll 295 bearings are fixed to a frame. The second pattern roll 300 is mounted to a pivot in the frame. The longitudinal axis of the second pattern roll 300 is parallel to the longitudinal axis of the first pattern roll 295 and offset such that the outer surface of the first pattern roll 295 is separated by a relatively short distance from the outer surface of the second pattern roll 300. Linear actuators known in the art can be connected to each of the two second pattern roll 300 bearing housings and move the second pattern roll 300 about a pivot point to engage the second pattern roll 300 with the first pattern roll 295 until the desired depth of engagement is attained. The linear actuators can be independently controlled to ensure consistent depth of engagement at both ends of the pattern rolls 295, 300. Linear actuators can engage the pattern rolls 295, 300, to maintain the depth of engagement as the rolls 295, 300 rotate, and disengage the pattern rolls 295, 300 at any desired time.

In a preferred embodiment, the second pattern roll 300 is engaged with the first pattern roll 295 so that the complementary patterns engage symmetrically. Lateral gaps between mating elements can be equal on both sides, as well as material machine direction gaps. In a non-limiting example, adjustment screws may be used to reposition the bearing housings in a material cross-machine direction relative to the frame and the first pattern roll 295 to equalize the lateral gaps between mating elements. A drive motor may be coupled to the first pattern roll 295. A first gear mounted to the first pattern roll 295 may engage and drive a second gear mounted to the second pattern roll 300 to maintain circumferential registration throughout the deformation process. Adjustment screws and circumferential slots in the second gear may be used to make circumferential adjustments and equalize material machine direction gaps between mating elements.

By way of example, sheet metal 120 is unwound from a supply coil 105 and fed into the sheet metal deformation unit 315 operation. The second pattern roll 300 is engaged with the first pattern roll 295 until the desired depth of engagement is attained. The sheet metal 120 continues passing between the pattern rolls 295, 300, is deformed out-of-plane in the Z-direction and is subsequently wound into the middle region 215 of tubular structure 180C. The tubular structure 180C formed in this manner can have substantially lower total mass with a relatively minor decrease in strength, modulus of elasticity, and pressure rating. This type of improved strength-to-weight tubular structure 180C may also be useful in aeronautical and space applications. Couplings can be used on both ends of the tubular structures 180C to totally enclose the void regions 285 which may become exposed due to subsequent transverse cut-off of the tubular structure 180C.

Sheet Surface Modifications

In some applications, it may be desired to use tubular structures 180 having enhanced surface properties on the interior and/or exterior of the tubular structure 180. For example, a food processing operation may require a smooth pipe interior that is resistant to buildup and microbial contamination. In prior art pipe fabrication processes, such as the production of seamless pipe, this is difficult to achieve. The original formed surface is, by nature, rough. Secondary smoothing processes may mitigate the roughness. But these are expensive, time consuming, and limited in effectiveness. A layered fabrication process, combined with the low temperature processing capability, can provide the desired pipe interior comprising enhanced surface properties.

For example, 316 grade cold rolled stainless steel is supplied in sheet metal form. The sheet metal may be produced with an ASTM No. 8 finish that is exceptionally smooth and mirror-like in its appearance. The surface can be further polished and/or sanded. This mirror-like surface may be used to form the first inner region of the desired tubular structure. A standard 316 stainless steel with a relatively rougher ASTM No. 2B finish may be used to form the succeeding middle region and third region of the pipe. This fabrication process provides the desired enhanced surface for the pipe's interior while maintaining the use of standard, cost effective materials for the overwhelming majority of the pipe's total material. The pipe's exceptionally smooth interior surface may effectively mitigate buildup and contamination as particles cannot easily stick to it. Cleaning and flushing operations can also easily remove any small areas of buildup that may occur.

In another non-limiting example, chemical treatments such as a low surface energy coating, microbial resistant coating, anti-microbial coating corrosion resistance, mitigating algae growth in subsea applications, combinations thereof and the like, may be applied to the 316 grade stainless steel sheet metal with an ASTM No. 8 finish prior to winding the sheet metal into the first inner region of the pipe. This selective coating may further enhance the surface properties of the pipe's interior and further mitigate buildup, contamination, and microbial growth. Any combination of coatings and finishing operations may be used to selectively improve the sheet metal 120 surface which subsequently forms the interior surface of a wound tubular structure 180.

Similar techniques may be used to provide enhanced surface properties for the exterior surface of the tubular structure 180. These improvements may mitigate environmental damage by providing corrosion resistance, mitigating algae growth in subsea applications, and the like. Any combination of coatings and finishing operations may be used to selectively improve the exterior surface of a wound tubular structure 180.

Adhesive Bonding of Layers

It may be necessary to constrain the respective layers from unwinding or unraveling during transportation and end usage in some layered tubular structure 180 applications. In one embodiment, the layers can be adhesively bonded during the manufacturing process using a class of adhesives known as structural adhesives. These adhesives are typically based on epoxy, acrylic, urethane, or cyanoacrylate chemistries and are known in the art to provide very strong bonds between adjoining metal surfaces. Adhesives may have discrete particles having a desired size, shape, crush-resistance, and/or volume disposed therein.

In one embodiment, adhesive is applied to one side of the sheet metal 120 after other processes such as splicing, void generation, and out-of-plane deformation are complete, and before the helical winding process. Adhesive application processes known in the art are suitable for applying the liquid adhesive in this application. These fluid application processes include spray, extrusion through nozzles, extrusion through slot dies, gravure, offset gravure, flexographic, permeable rolls, jetting, and spray systems. In one non-limiting example, a permeable roll is used to apply adhesive to sheet metal 120 just prior to sheet metal 120 being wound to form tubular structure 180. Adhesive is applied in a desired pattern (defined by the aperture pattern in the surface of the permeable roll) to the top face of sheet metal 120 as sheet metal 120 travels in a near-horizontal plane just prior to entering recoiler 150 and the winding process. The application pattern may be optimized for the particular tubular structure 180 application. For example, adhesive can be applied in continuous lines along both edges of the sheet metal 120, and in discrete dots spaced apart in regular intervals in both the material machine- and cross machine directions. In a preferred embodiment, the adhesive is applied to at least one sheet metal in each of the inner, middle, and outer regions of the tubular structure 180. The adhesive is preferably applied to a first sheet metal face which is adjacent the face of an adjoining second sheet metal after the first and second sheet metals are helically wound into the tubular structure 180.

Returning to FIG. 1, as a first sheet metal 120 enters the helical winding process, it is guided around the longitudinal axis of mandrel 160 to form first layer 210 of tubular structure 180. The outer face of first sheet metal 120 may comprise adhesive pattern 197. After at least a portion of first sheet metal 120 is helically wound on mandrel 160 to form the inner region 210, a second sheet metal 120 is fed into the winding process and overlies first sheet metal 120 to form the middle region 215. The inner face of second sheet metal 120 adjoins the outer face of first sheet metal 120 and may comprise adhesive pattern 197. The outer face of second sheet metal 120 may also comprise adhesive pattern 197. After at least a portion of the second sheet metal 120 is helically wound on mandrel 160 to form the middle region 215, a third sheet metal 120 is fed into the winding process and overlies the second sheet metal 120 to form the third outer region 220. The inner face of third sheet metal 120 adjoins the outer face of second sheet metal 120 and may comprise adhesive pattern 197. In a preferred embodiment, adhesive is not applied to the outer face of third sheet metal 120. This ensures no adhesive is present on the exterior of the tubular structure 180.

In another embodiment, the widths of all sheet metals can be substantially the same. The location of each in-feed and the angle of each in-feed are controlled to position the edges of sheet metal within a layer in edge to edge alignment. The edges are preferably in edge to edge contact and have no overlap. The seam between edges within a layer is preferably aligned with the center region of the underlying layer. This configuration maximizes the distance along the longitudinal axis of the tubular structure of the edge seam in one layer and the edge seam in the underlying layer, thereby maximizing structural rigidity and mitigation of gas or liquid leakage through the tubular structure wall.

In yet another embodiment, adhesive can be applied in a pattern to bond radially adjacent layers of sheet metal. The pattern may provide at least 30% or at least 40% or at least 50% unbonded area. The unbonded area preferably provides a radial gap between adjacent layers of sheet metal of at least 0.002" or at least 0.003" or at least 0.004". The radial gap may be determined by controlling the type of adhesive, adhesive viscosity, the placement of discrete particles within the adhesive, the size of discrete particles disposed within the adhesive, the adhesive application rate per unit area, or any combination thereof. It has been surprisingly found that this bonding configuration can provide a desirable improvement in insulation capability in the wall of the resulting tubular structure due to the resulting air gap between radially adjacent layers of sheet metal. This improvement in insulation capability can reduce or eliminate the need for supplemental exterior or integrated insulation and provide significant cost savings.

By way of example, a tubular structure 180 can be produced by sequentially winding at least two sheet metals 120 on a mandrel 160 that forms the longitudinal axis 235 of a tubular structure 180. A first sheet metal 120, comprising a first metal material 200, is supplied in a first supply coil 105, unwound, conveyed, and rewound into a first inner region 210 of a desired tubular structure 180. At least a portion of adjacent helical windings disposed within the first inner region 210 of the desired tubular structure 180 can be welded 195 together during the manufacturing process 100. An adhesive comprising a plurality of discrete particles having a predetermined dimension(s) can be disposed upon the outwardly facing surface of the first inner region of tubular structure 180.

A second sheet metal 120A, comprising a second metal material 205, is supplied in a second supply coil 105B. A leading edge 175 of the second sheet metal 120B is prepared with a generally straight edge in the cross-machine direction and conveyed to the recoiler 150 and welded 195 to the outer surface of first metal material 200 comprising the first inner region 210 of the helically wound tubular structure 180. The second sheet metal 120A is then rewound to overlay the first sheet metal 120 and the adhesive comprising discrete particles disposed upon the surface thereof to form the desired tubular structure 180. At least a portion of adjacent helical windings can be welded 195 together during the winding process 100. Any number of the regions (i.e., two, three, or more) forming tubular structure 180 can have an adhesive comprising discrete particles therein disposed upon a surface thereof and have a succeeding region disposed thereupon.

Some adhesives can require curing at elevated temperatures. If these adhesives are selected, the finished tubular structure 180 may be placed inside an oven known to provide the required curing environment. Some adhesives also require two parts, with one fluid acting as a catalyst to activate the bonding in the other fluid. If these adhesives are used, a secondary permeable roll may be used to apply the second adhesive to the adjoining face of sheet metal prior to the winding process. The first and second adhesives may be registered in both the material machine- and cross-machine directions by means known in the art to ensure the two adhesives are brought into face to face contact in the winding process.

The continuous lines of adhesive at both sides of sheet metal 120 ensure uninterrupted sealing at all edges of tubular structure 180. This can ensure no inter-layer migration of the interior fluid or gas conveyed within tubular structure 180 and can prevent exterior inter-layer migration of environmental liquids or gas.

The adhesive bonding process provides an effective means for creating a rigid structure from multiple layers of a relatively flexible sheet metal 120. The strength, modulus of elasticity, and pressure ratings of such tubular structures are theoretically equivalent to homogenous material structures comprising similar materials and dimensions.

Welding of Layers

Welding can be used to constrain the layers from unwinding or unraveling during transportation and end usage. In one embodiment, the layers are welded during the fabrication process using a fiber laser system.

The welding operation can be applied to one side of sheet metal 120 after other processes such as splicing, void generation, and out-of-plane deformation are complete, and before or during the winding process. Many welding processes are known in the art and several are suitable for permanently joining adjacent layers of sheet metal 120 in a wound tubular structure 180. These welding processes include shielded metal arc welding, gas metal arc welding, flux-cored arc welding, gas tungsten arc welding, submerged arc welding, electron beam welding, and laser welding. Several types of laser welding are known in the art and may be used, including gas lasers (which use a gas such as helium, nitrogen, or carbon dioxide as the medium), solid state lasers (which use solid media such as neodymium in yttrium aluminum garnet, or Nd:YAG), and fiber lasers (in which the medium is the optical cable itself). Fiber laser welding can be used to permanently attach adjacent layers of sheet metal 120 in a wound tubular structure 180. Fiber laser welding may permanently join as few as two adjacent layers or, if more power is applied, permanently join three or more adjacent layers of sheet metal 120. Fiber laser welding may be done in continuous lines or in discrete zones. The laser head may be positioned near the sheet metal to be welded and moved quickly and accurately in the x, y, and z planes by means known in the art to weld in any desired pattern. To improve operating rate and efficiency, multiple laser heads may be used to simultaneously weld multiple locations of sheet metal 120.

In a non-limiting example, three fiber lasers are mounted above the helical winding mandrel 160 and pointed in a generally vertical plane toward the rewinding tubular structure 180. The rewound tubular structure 180 comprises three layers; an inner layer 210, a middle layer 215, and an outer layer 220. The inner layer 210 is formed by sheet metal 120A first being helically wound about winding mandrel 160. The middle layer 215 is subsequently formed by sheet metal 120B being helically wound about winding mandrel 160 and overlying inner layer 210. In a preferred embodiment, the width of sheet metal 120B is the same as sheet metal 120A and the infeed spacing and infeed angle of sheet metal 120B are controlled to align the edges of sheet metal 120B with the center region of underlying sheet metal 120A. The outer layer 220 is subsequently formed by sheet metal 120C being helically wound about winding mandrel 160 and overlying middle layer 215. In a preferred embodiment, the width of sheet metal 120C is the same as sheet metal 120B and the infeed spacing and infeed angle of sheet metal 120C are controlled to align the edges of sheet metal 120C with the center region of underlying sheet metal 120B. In a preferred embodiment, the width and infeed angle for each sheet metal 120A, 120B, and 120C are controlled to ensure all upstream edges of the helically wound sheet metal within each respective layer adjoins the downstream edge of the respective sheet metal in a succeeding helical convolution. The first fiber laser may weld the adjoining edges of sheet metal 120A at a point downstream of the first contact point between sheet metal 120A and winding mandrel 160 and upstream of the first contact point between sheet metal 120B and winding mandrel 160. The second fiber laser may weld the adjoining edges of sheet metal 120B at a point downstream of the first contact point between sheet metal 120B and winding mandrel 160 and upstream of the first contact point between sheet metal 120C and winding mandrel 160. The third fiber laser may weld the adjoining edges of sheet metal 120C at a point downstream of the first contact point between sheet metal 120C and winding mandrel 160. The power of the second fiber laser may be controlled to a level sufficient to weld the adjacent edges of sheet metal 120B while simultaneously welding at least a portion of sheet metal 120B to underlying sheet metal 120A. The power of the third fiber laser may be controlled to a level sufficient to weld the adjacent edges of sheet metal 120C while simultaneously welding at least a portion of sheet metal 120C to underlying sheet metal 120B. A wound tubular structure 180 can be permanently welded together at any desired combination of locations, including sheet edges in each layer of tubular structure 180 and at underlying central portions of the preceding layer to provide a rigid structure and to prevent leakage of a fluid or gas from the interior of the tubular structure to the exterior of the tubular structure or to prevent contamination from the exterior of the tubular structure into the interior of the tubular structure.

The welding process can provide an effective means for creating a rigid structure from multiple layers of a relatively flexible sheet metal 120. The strength, modulus of elasticity, and pressure ratings of such tubular structures 180 are theoretically equivalent to homogenous tubular structures comprising similar materials and dimensions.

Creation of Enclosed Internal Pockets

Figure 13:
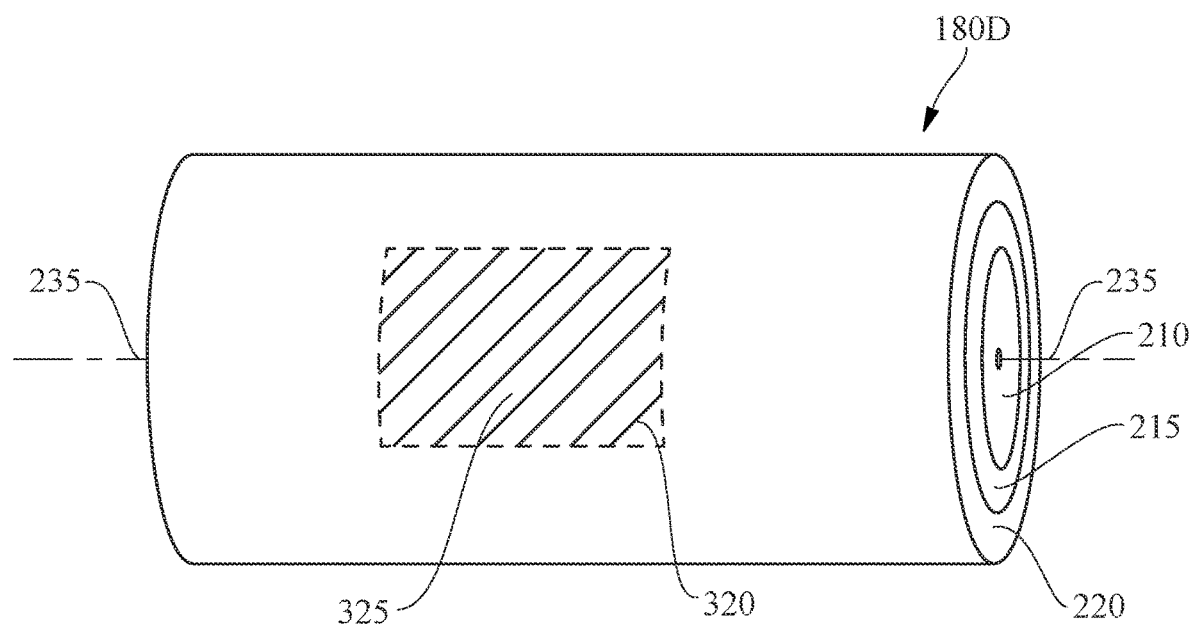
FIG. 13 is a perspective view of still another helically wound tubular structure.

Referring to FIG. 13, tubular structures 180D having a middle region 215A comprising enclosed internal pockets 320 can be filled with a material 325 (e.g., insulation, etc.)

that can provide additional capabilities and benefits. For example, insulation may be required to maintain a desired temperature of fluid within a pipe. The insulation may be disposed within the tubular structure 180H to better control the temperature of the fluid conveyed through the pipe and may be totally enclosed to protect the insulation from the internal/external environment.

In a first embodiment, homogenous sheet metal 120 is wound to form first inner region 210 of tubular structure 180D. Voids 230 are then generated in sheet metal 120B prior to winding sheet metal 120B into a second middle region 215A of tubular structure 180D. Homogenous sheet metal 120C is then wound to form a third outer region 220 of tubular structure 180D. Voids 230 can be generated by any process as discussed supra. The position, size, shape, material machine direction spacing within sheet metal 120B, material cross-machine direction spacing within sheet metal 120B of the voids 230, width of sheet metal 120B, and the infeed angle of sheet metal 120B may be selected to optimize performance of the insulation and provide enough support for the overlying third outer region 220 of the tubular structure. The number of layers comprising voids 230 may also be selected to optimize performance of the insulation and provide enough support for third region 220 of tubular structure 180D. The size, shape, and spacing of voids 230 within each layer of second middle region 215A may be controlled to create aligned edges of voids 230 radially, circumferentially, and along the longitudinal axis of helically wound tubular structure 180D. The first inner region 210 of homogenous sheet metal 120, the aligned void 230 edges, and the third region 220 of homogenous sheet metal 120 form internal enclosed pockets 320. The depth of internal enclosed pockets 320 may be controlled by generating voids 230 in the number of desired layers of sheet metal 120 within wound tubular structure 180D and by selecting the desired sheet metal 120 thickness for the sheet metal 120 forming middle region 215A. The winding process is paused after the middle region 215A of tubular structure 180D has been formed, material 325 (e.g., insulation) is inserted into the enclosed internal pockets 320, and the third region 220 of the tubular structure 180D is subsequently wound to enclose the pockets 320 comprising insulation. A wide range of insulation materials are suitable for integration within wound tubular structures 180D. Non-limiting examples include mineral wool, rigid polyurethane foam, and silica or other aerogels.

Two or more radial zones of insulation may be integrated within tubular structure 180D. A second zone of internal enclosed pockets 320 may overlie a first zone of internal enclosed pockets 320. The position, size, shape, circumferential spacing, spacing along the longitudinal axis of tubular structure 180D, and depth of internal enclosed pockets 320 in the first internal zone may differ from the position, size, shape, circumferential spacing, spacing along the longitudinal axis of tubular structure 180D, and depth of the internal enclosed pockets 320 in the second internal zone. The design of the enclosed internal pockets 320 of the wound tubular structure 180D and the insulation enclosed in pockets 320 may be selected to optimize the insulation capabilities of the tubular structure 180D for any selected application.

A vacuum can be generated and maintained within at least a portion of the enclosed internal pockets 320. Insulation effectiveness may be substantially improved by the vacuum level. In general, the greatest improvement in insulation effectiveness may be achieved by higher vacuum levels. In one embodiment, the vacuum within the enclosed internal pocket 320 can be maintained at a level less than 100 torr (133.32 millibars). In a more preferred embodiment, the vacuum within the enclosed internal pockets 320 can be maintained at a level less than 10 torr (13.33 millibars). A vacuum within a pocket 320 may be generated by means known in the art, such as inserting an access valve through the third region 220 of wound tubular structure 180D and into pocket 320. A pump may then be used to evacuate the air to a desired vacuum level. The access valve may have enough sealing capability to maintain the vacuum level for an extended period. The preservation of vacuum levels within pocket 320 may be enhanced by the application of a sealant to at least one face of sheet metal 120 comprising voids 230 prior to winding sheet metal 120 into tubular structure 180D. In a preferred embodiment, the sealant forms a continuous seal along the entire edge of each void 230 within sheet metal 120. A wound tubular structure 180D can comprise well sealed joints between adjacent layers of sheet metal 120 that form the pocket 320 surfaces.

Figure 14:
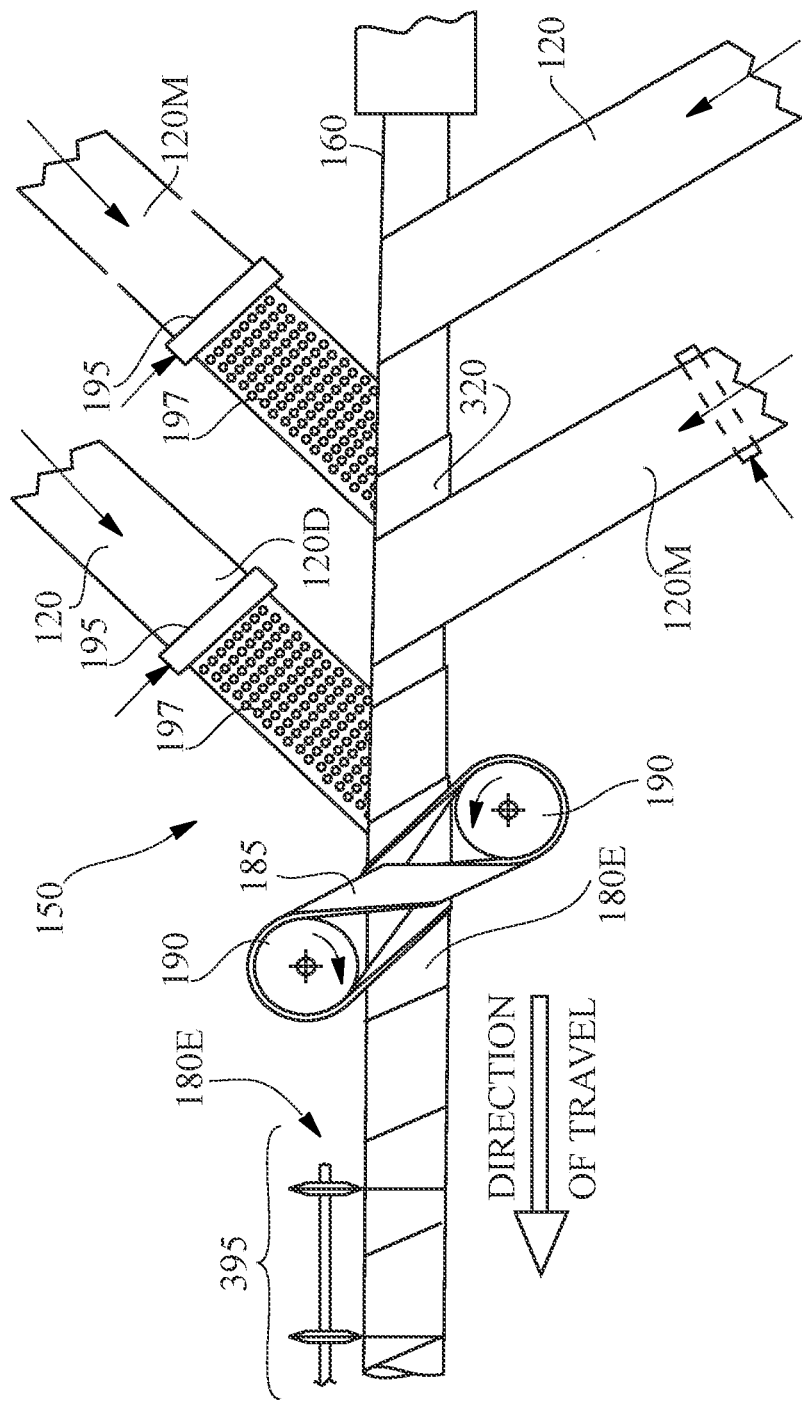
FIG. 14 is a side elevational view of another exemplary process for the manufacture of helically wound tubular structures.
Figure 15:
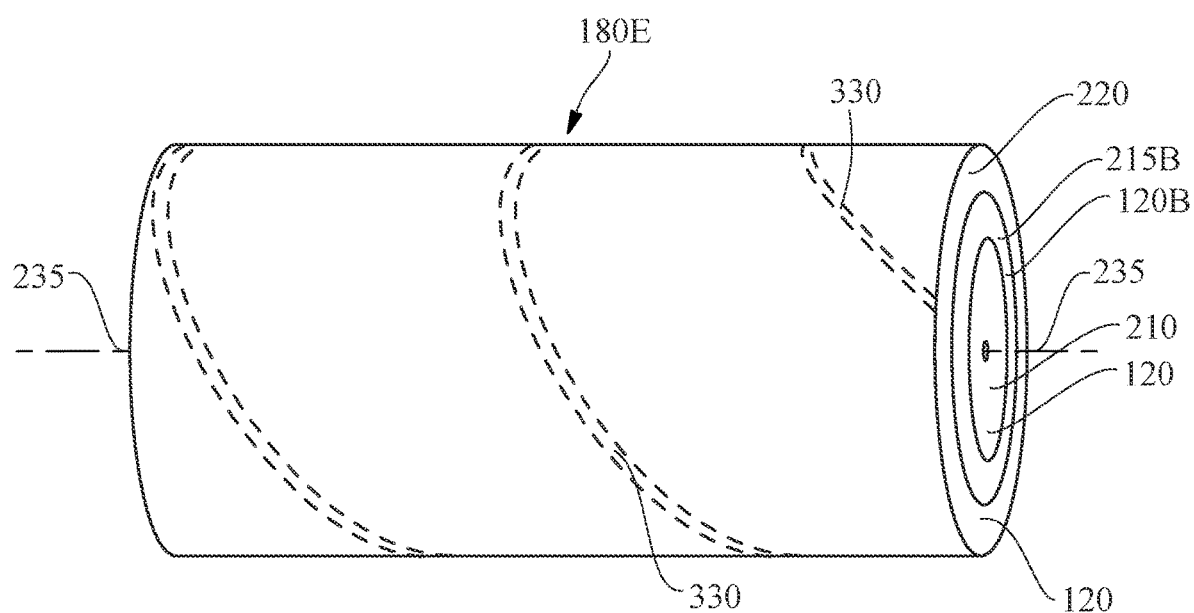
FIG. 15 is a perspective view of another helically wound tubular structure having a channel disposed within the structure.
Figure 16:
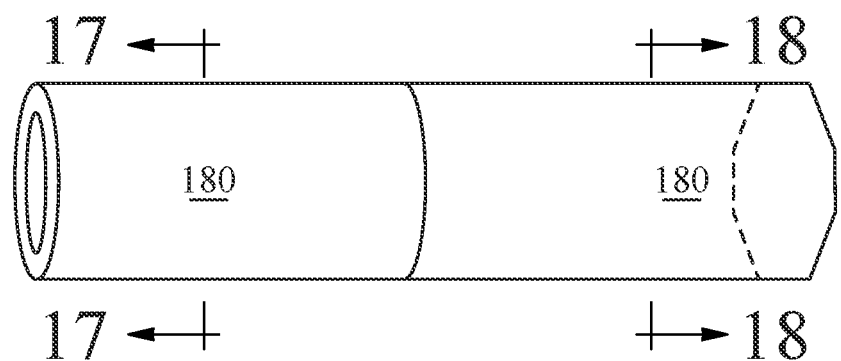
FIG. 16 is a plan view of an exemplary elongate tubular structure formed from a first and second tubular structure where the first tubular structure has an exemplary elliptical cross-section, and the second tubular structure has an exemplary polygonal cross-section.
Figure 17:
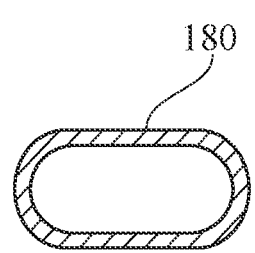
FIG. 17 is a cross-sectional view of the exemplary elongate tubular structure of FIG. 16 taken along line 17-17; and, FIG. 18 is a cross-sectional view of the exemplary elongate tubular structure of FIG. 16 taken along line 18-18.
Figure 18:
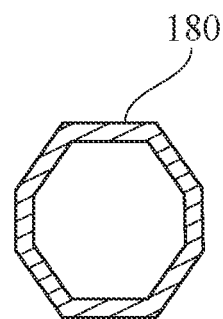

FIGS. 14 and 15 provide an apparatus and a resulting third embodiment where a continuous void forms a channel within a wound tubular structure 180E that provides a continuous passageway 330 for a second gas or second fluid that may be used to transfer heat to, or from, the first gas or first fluid flowing through the interior of tubular structure 180E. In another embodiment, two or more gas or fluid passageways 330 can be disposed coaxially between the interior of tubular structure 180E and the exterior surface of tubular structure 180E. These passageways 330 may be oriented to flow from a first end of tubular structure 180E to the opposite second end of tubular structure 180E, and generally circumferentially about, and disposed angularly relative to, to the longitudinal axis 235 of tubular structure 180E. Passageways 330 may also comprise a circumferential flow component wherein the flow is helical about the longitudinal axis of the tubular structure. The passageways 330 flow may comprise any desired combination of an axial flow component and a circumferential flow component. In one embodiment multiple passageways 330 may not intersect.

In a non-limiting example, the passageway 330 is formed by winding a first homogenous sheet metal 120 into a first inner region 210 of tubular structure 180E. Adjacent edges or layers of first sheet metal 120 forming first inner region 210 can be welded together as they are wound into tubular structure 180E as described supra. A second and third sheet metal 120M (each generally more narrow than first sheet metal 120) are then wound to form the first layer of middle region 215B. The width and infeed angle of second sheet metal 120M are controlled to form a first gap width disposed about the longitudinal axis of tubular structure 180E between succeeding helical convolutions of second sheet metal 120M. If desired, a third, fourth, fifth, etc. sheet metal 120M can be disposed to overlay each of the previous second sheet metals 120M wound to form the second layer of middle region 215B. The position, width, and infeed angle of third (and so on) sheet metals 120M are controlled to position third sheet metal 120M such that it substantially overlies second sheet metal 120M while also forming the first gap width radially about and coaxially along the longitudinal axis of tubular structure 180E between succeeding helical convolutions of third sheet metal 120M. Additional layers of sheet metal may also be wound to create a desired thickness of middle region 215B. A fourth sheet metal 120D is then helically wound to form the third outer region 220. In a preferred embodiment, adjoining edges of the fourth sheet metal 120D are welded after winding into tubular structure 180E. The helical void region formed by the first inner region 210, gaps between succeeding helical convolutions within the layers of middle region 215B, and outer region 220 define the desired passageway 330.

After helically wound tubular structure 180E has been cut off to a desired length, end plates with the appropriate shape and size can then be attached to both ends of tubular structure 180E to completely enclose the continuous passageway. The inlet for the second gas or second fluid at the first end of tubular structure 180E may be provided in the first end plate or through a portion of third region 220 of tubular structure 180E. The outlet for the second gas or second fluid at the second opposite end of tubular structure 180E may be provided in the second end plate or through a portion of third region 220 of tubular structure 180E at the second opposite end of tubular structure 180E. The second gas or second fluid may be connected via such inlets and outlets to adjacent sections of tubular structures 180E. Such embodiments comprising a second gas, or a second fluid, provide an improved means for transferring heat to or from the first gas or first fluid flowing through the interior of a tubular structure 180E.

Cutoff of Tubular Structure to a Desired Length

Helically wound tubular structures are inherently endless, meaning the final length of the tubular structure is not defined by the winding process. Continued winding creates a continuation of formed material along the longitudinal axis of the tubular structure, thereby continuously adding to the length of the tubular structure. In many applications in which said tubular structures are used, a specific final length of the tubular structure is desired. A final length may be provided for helically wound tubular structures by transverse cutting devices in cutting region 395. Many transverse cutting devices are known in the art and may include rotating saw blades, water jet nozzles, lasers, and the like. In a preferred embodiment, the distance along the longitudinal axis of the tubular structure is monitored by means known in the art. Once the length reaches the desired target, the transverse cutting device engages with the exterior surface of the tubular structure and cuts through the wall around the entire circumference, thereby cutting off a portion of the winding tubular structure at the desired length. The cutting device may be controlled to move alongside the tubular structure such that the translational speeds are substantially matched. The cutting action may be oriented perpendicular to the longitudinal axis of the tubular structure. The resulting cut may create a desired flat cut surface which is substantially perpendicular to the longitudinal axis of the tubular structure.

Couplings

After cutoff, couplings may be attached to one or both ends of the resulting tubular structure by welding or other means known in the art. The couplings may provide an efficient means for connecting tubular structures within a piping network or any other constructed assembly.

Any dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A tubular structure comprising:
    a) a first inner region of the tubular structure comprising layers of a first sheet metal helically wound about a longitudinal axis;
    b) a second middle region of the tubular structure comprising layers of a second sheet metal having a plurality of voids disposed therein, said second sheet metal being helically wound about said longitudinal axis and coaxially about said first inner region, wherein a first set of the plurality of voids is located in a first layer of said second sheet metal and a second set of said plurality of voids is located in a second layer of said second sheet metal, said second layer being more radially distant from said longitudinal axis than said first layer of said second sheet metal,
    wherein the voids of said first set are each aligned with a respective one of said voids of said second set such that the second middle region comprises internal pockets each defined by a void of the first set and an aligned void of the second set;
    wherein the plurality of voids further comprises at least one of:
        1) said voids of said second set of said plurality of voids being more spaced from one another than said voids of said first set of said plurality of voids are from each other; and
        2) a second length dimension of each of said voids of said second set of said plurality of voids being greater than a corresponding first length dimension of each of said voids of said first set of said plurality of voids;
    c) a third outer region of the tubular structure comprising layers of an additional sheet metal helically wound about said longitudinal axis and coaxially about said first sheet metal and said second sheet metal, enclosing the internal pockets of the second middle region; and
    d) an insulation disposed within said enclosed internal pockets, said insulation being selected from the group consisting of mineral wool, fiberglass, rigid polyurethane foam, silica, aerogels, a vacuum, and combinations thereof.

2. The tubular structure of claim 1 wherein said second sheet metal is bonded to said first sheet metal.

3. The tubular structure of claim 2 wherein said bonding is selected from the group consisting of adhesive bonding, welding, and combinations thereof.

4. The tubular structure of claim 3 wherein at least 30% of an interface between said second sheet metal and said first sheet metal is unbonded resulting in an air gap providing added insulation capability to the tubular structure.

5. The tubular structure of claim 1 wherein the additional sheet metal of the third outer region is a third sheet metal, wherein said third sheet metal is bonded to said second sheet metal.

6. The tubular structure of claim 1 wherein a first metallic composition of said first sheet metal and a second metallic composition of said second sheet metal are different from each other.

7. The tubular structure of claim 1 wherein said tubular structure has an inside diameter, a wall thickness, and an outside diameter, wherein each of said inside diameter, said wall thickness, and said outside diameter have a standard deviation of less of than about 1.5% of a respective average measurement for said inside diameter, said wall thickness, and said outside diameter as determined by a Pipe Dimension Measurement system.

8. The tubular structure of claim 1 wherein said tubular structure has a cross-sectional geometry, said cross-sectional geometry being selected from the group consisting of circular cross-sections, polygonal cross-sections, elliptical cross-sections, and combinations thereof.

9. The tubular structure of claim 1 wherein a surface of said first sheet metal disposed proximate to said longitudinal axis has enhanced surface properties, said enhanced surface properties being provided by a process selected from the group consisting of chemical treatments, polishing, sanding, and combinations thereof.

10. The tubular structure of claim 1 wherein each of said plurality of voids in said first set has a length L1 and each of said plurality of voids in said second set has a length L2 and wherein L2>L1.

11. The tubular structure of claim 10 wherein a ratio of L2 to L1 is a function of a thickness of said second sheet metal.

12. The tubular structure of claim 1 wherein each of said plurality of voids in said first set is spaced from an adjacent void in said first set a distance D1 and each of said plurality of voids in said second set is spaced from an adjacent void in said second set a distance D2 and wherein D2>D1.

13. The tubular structure of claim 12 wherein a ratio of D2 to D1 is a function of a thickness of said second sheet metal.

14. The tubular structure of claim 1, wherein the second middle region further comprises a third sheet metal helically wound about said longitudinal axis and coaxially about said first sheet metal and said second sheet metal, the third sheet metal comprising voids which align with respective voids of the second sheet metal such that the internal pockets of the second middle region are each further defined by a void of the third sheet metal, wherein the additional sheet metal of the third outer region is a fourth sheet metal helically wound about said longitudinal axis and coaxially about said first sheet metal, said second sheet metal and said third sheet metal.

15. The tubular structure of claim 1, wherein the additional sheet metal of the third outer region is a third sheet metal, wherein a first metallic composition of said first sheet metal and a third metallic composition of said third sheet metal are the same.

* * * * *